(12) United States Patent
Okamoto et al.

(10) Patent No.: US 6,668,793 B2
(45) Date of Patent: *Dec. 30, 2003

(54) INTERNAL COMBUSTION ENGINE

(75) Inventors: Yoshio Okamoto, Minori (JP); Ayumu Miyajima, Narita (JP); Yuzo Kadomukai, Ishioka (JP); Motoyuki Abe, Chiyoda (JP); Shigenori Togashi, Abiko (JP); Hiromasa Kubo, Yokohama (JP); Hiroshi Fujii, Tokyo (JP); Toru Ishikawa, Kitaibaraki (JP); Toshiharu Nogi, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 68 days.

This patent is subject to a terminal disclaimer.

(21) Appl. No.: 09/954,268

(22) Filed: Sep. 18, 2001

(65) Prior Publication Data

US 2002/0050267 A1 May 2, 2002

(30) Foreign Application Priority Data

Sep. 18, 2000 (JP) .................................... 2000-286854

(51) Int. Cl.[7] .................................................. F02B 3/00
(52) U.S. Cl. ....................... 123/299; 123/301; 123/305
(58) Field of Search ................... 123/294, 295, 123/299, 305, 467, 468, 470; 239/533.12, 533.2, 463

(56) References Cited

U.S. PATENT DOCUMENTS

| 4,790,270 A | | 12/1988 | McKay et al. |
|---|---|---|---|
| 4,844,030 A | * | 7/1989 | McAvoy .................. 123/193.5 |
| 5,392,745 A | * | 2/1995 | Beck .......................... 123/295 |
| 5,577,481 A | | 11/1996 | Wahba |
| 6,095,113 A | | 8/2000 | Nogi et al. |
| 6,453,872 B1 | * | 9/2002 | Miyajima et al. ........... 123/298 |

FOREIGN PATENT DOCUMENTS

| DE | 19947 342 A1 | 4/2000 |
|---|---|---|
| EP | 0 905 360 A2 | 3/1999 |
| EP | 0 918 155 A2 | 5/1999 |
| JP | 6-81651 | 3/1994 |
| JP | 6-81656 | 3/1994 |

OTHER PUBLICATIONS

Patent Abstracts of Japan, 06–081651, Mar. 22, 1994.
Patent Abstracts of Japan, 06–081656, Mar. 22, 1994.

* cited by examiner

*Primary Examiner*—John Kwon
(74) *Attorney, Agent, or Firm*—Antonelli, Terry, Stout & Kraus, LLP

(57) ABSTRACT

A fuel spray is directed toward an ignition plug. To an injection bole outlet portion of a swirl type fuel injector, an L-shaped cut out is provided, and the fuel spray is formed with a deflection fuel spray which has a strong swirl component that can inject with a large quantity. Accordingly, a reduction in the discharge HC amount and an improvement in the fuel consumption can be attained.

5 Claims, 20 Drawing Sheets

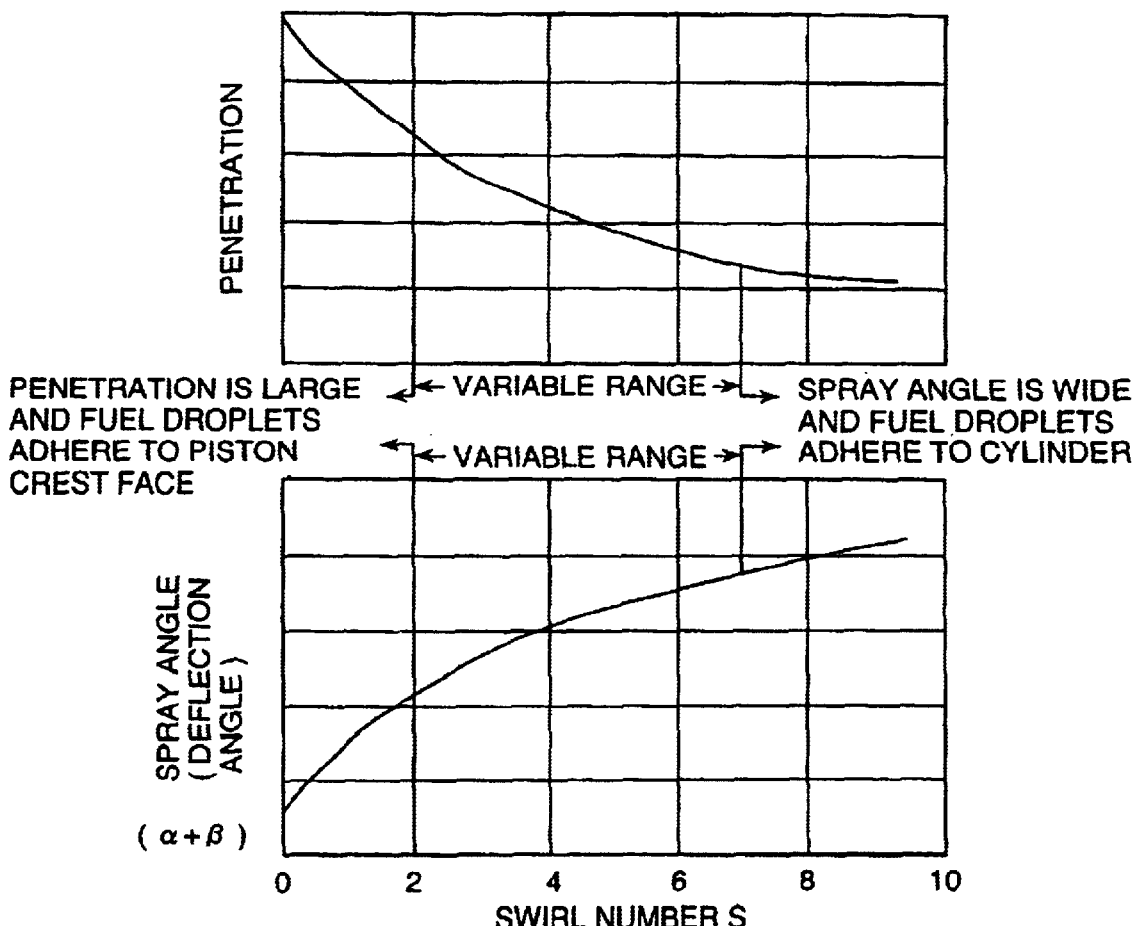
FIG. 11(a)(1)
FIG. 11(a)(2)
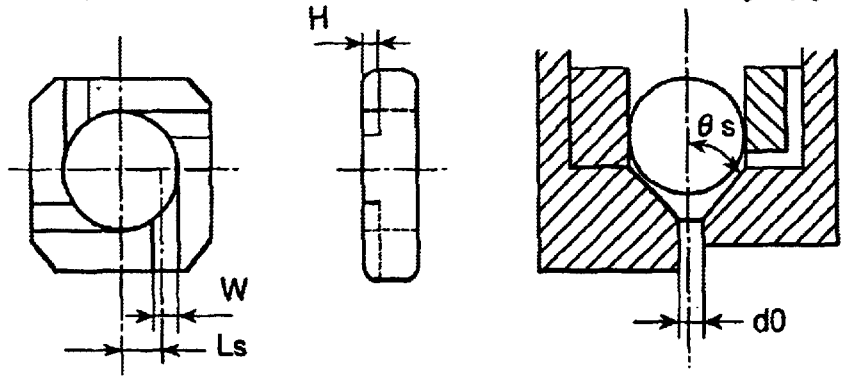
FIG. 11(b)(1)   FIG. 11(b)(2)   FIG. 11(b)(3)

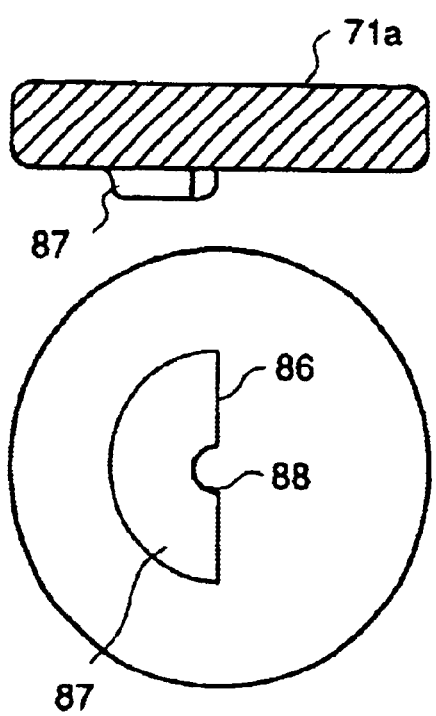
FIG. 16(a)
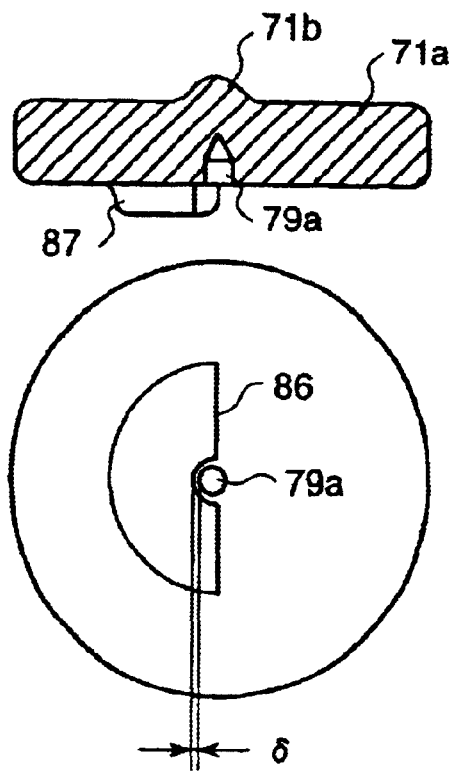
FIG. 16(b)
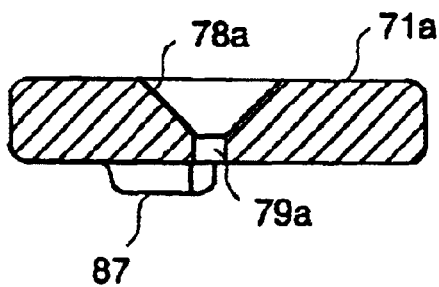
FIG. 16(c)
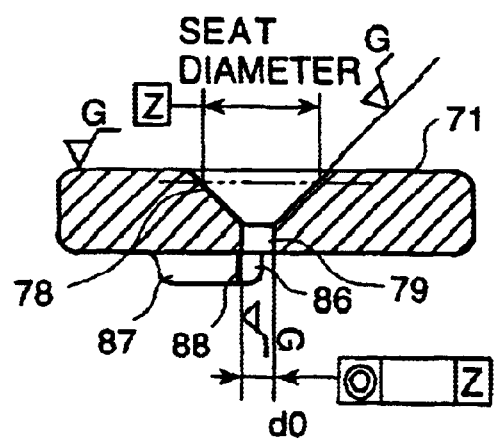
FIG. 16(d)
FIG. 16(e)
FIG. 16(f)

FIG. 23
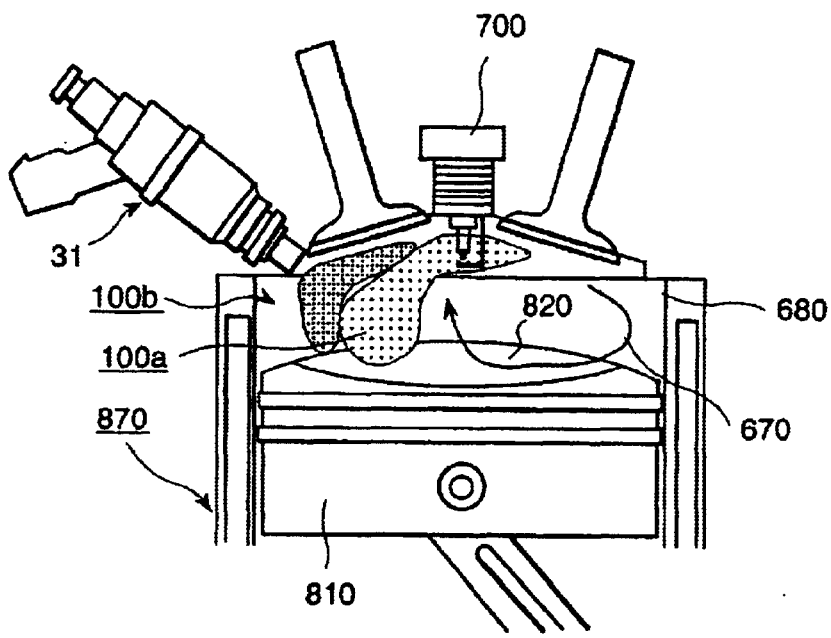
FIG. 25(a)
FUEL INJECTION SIGNAL
FIG. 25(b)
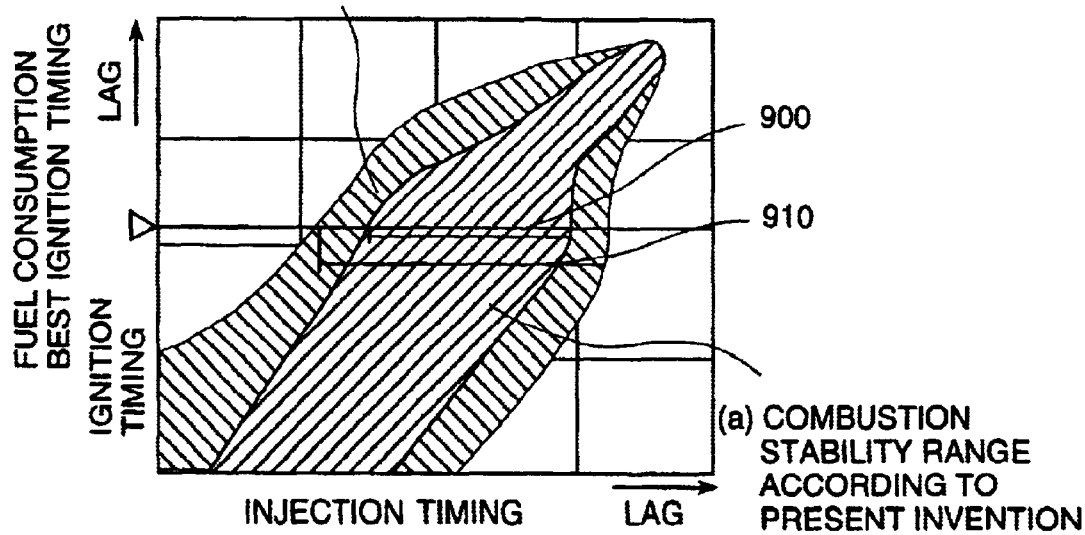

FIG. 24(a)
WIRING CONSTITUTION VIEW
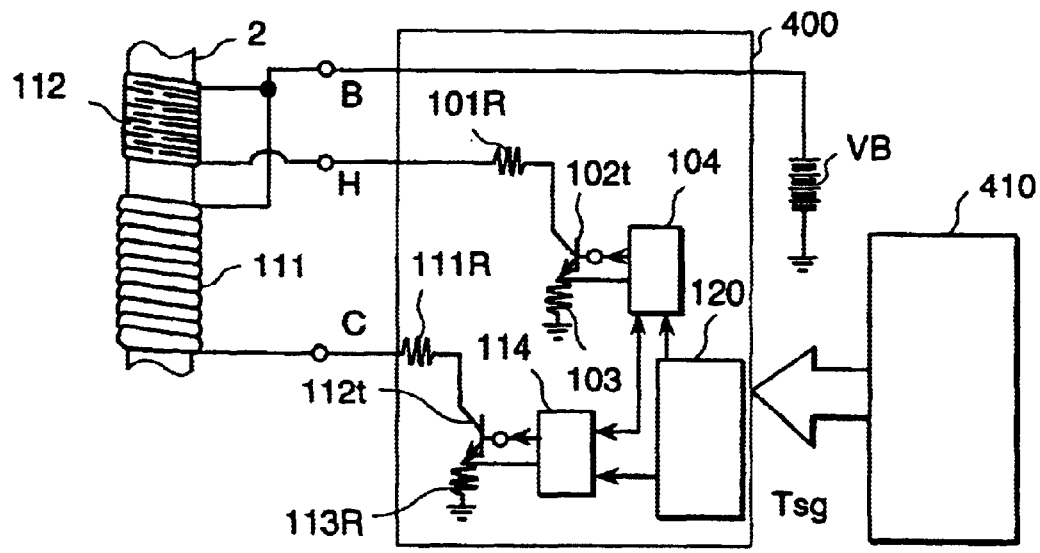
FIG. 24(b)
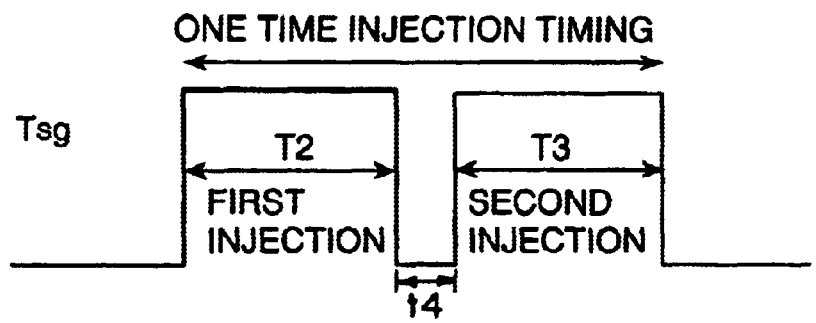
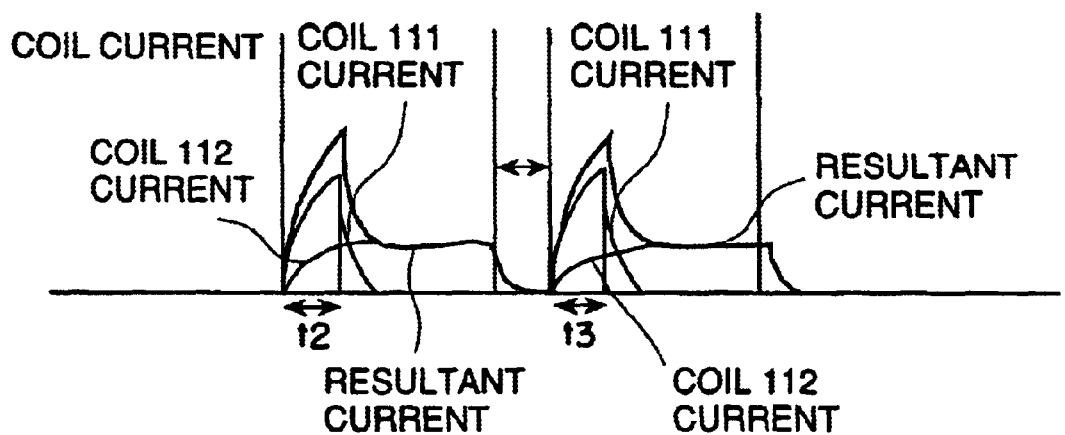

INTERNAL COMBUSTION ENGINE

BACKGROUND OF THE INVENTION

The present invention relates to a fuel injector for supplying fuel directly to a cylinder in an internal combustion engine; and, more particularly the invention relates to a technique using this a fuel injector.

In an internal combustion engine in which fuel is injected directly into a cylinder of the engine, a stratification combustion system has been proposed in which a thick air-fuel mixture is injected in the cylinder in the vicinity of an ignition plug and a thin air-fuel mixture is formed in the area surrounding the ignition plug, so that an improvement in fuel consumption is obtained.

An example of the above-stated internal combustion engine is shown in Japanese application patent laid-open publication No. Hei 6-81651. In the technique described in this publication, a tumble flow is formed in a cylinder, and the injected fuel is directed so as to collide with the piston and be guided by the wall of a cavity portion of the piston. By using this tumble flow technique, the fuel is supported and supplied to the ignition plug.

Further, in Japanese application patent laid-open publication No. Hei 6-81656, a tumble flow is formed in a cylinder and directed in two directions, which include an ignition plug direction from a first fuel injection port of a fuel injector and an ignition plug direction from to a second fuel injection port toward an ignition plug (through immediately under an intake valve and to aim a vicinity immediately under of an exhaust valve and a slight slant lower direction relative to a cylinder direction).

In the above-stated conventional techniques, there is no need to take into consideration adhesion of fuel to a wall face of the piston and a wall face of the cylinder or to the cylinder head, since the fuel adhesion generates to the piston, etc., it is not preferable to reduce a discharge HC (an unburned hydrocarbon) according to an incomplete combustion of the adhered fuel.

The characteristic of a fuel spray injected by a fuel injector and an intake air tumble relate to a combustion characteristic of the internal combustion engine. As to the characteristic of the fuel spray, firstly it relates to the fuel spray shape, and this becomes a factor of the spread angle of the fuel spray and the distance the spray is projected. Secondly, it relates to the fuel spray particle diameter. In this regard, it is necessary to improve the uniformity of the particle distribution by lessening the number of large particles in the fuel spray as much as possible. Thirdly, it relates to the fuel spray structure. In this regard, it is necessary to properly form a spacious distribution of the fuel particles in the fact to be sprayed.

On the other hand, the combustion characteristic of the internal combustion engine also has three main factors. The first factor is to improve ignition performance. For this, it is necessary to provide a large fuel particle distribution in the area surrounding the ignition means and to heighten a distribution of an air-fuel mixture of a combustible concentration and also stay in a long period the air-fuel mixture. Accordingly, an enlargement of the combustion stability range can be attained. Secondly, the fuel particle distribution in the piston direction is made small and the fuel adhesion is restrained; accordingly, the reduction in unburned gas components (HC, CO) of the combustion can be realized. Thirdly, to secure the combustion stability characteristic in a wide region from a low number of engine rotations (engine speed) to a high number of rotations, it is unnecessary to change the fuel spray shape according to a pressure change in the cylinder.

Since a geometric position between the fuel injector and the ignition means is fixed, to always supply a fuel spray having a suitable concentration to the ignition means, it is important to make the spread of the fuel spray constant.

In other words, in the fuel spray which is injected from the conventional fuel injector (for example, an axial symmetric hollow shaped fuel spray obtained by a straight fuel injection port), the fuel spray spreads when the cylinder-in pressure is low, and when the cylinder-in pressure increases, it has a decay in which the fuel spray is crushed and becomes narrow.

In this case, if the cylinder-in pressure is made comparatively high as a standard, when the arrangement between the fuel injector and the ignition means is determined, during the time the cylinder-in pressure is low, fuel adheres easily to a cylinder upper face and a cylinder side face of the cylinder, and to the piston head.

On the other hand, if the cylinder-in pressure is made comparative low as a standard, when the cylinder-in pressure becomes high, there is a decay in which the fuel spray suitable to the combustion will hardly to reach the ignition means.

SUMMARY OF THE INVENTION

An object of the present invention is to provide an internal combustion engine wherein a good ignition performance of the internal combustion engine can be obtained.

Another object of the present invention is to provide an internal combustion engine wherein an enlargement of the combustion stability range can be achieved.

A further object of the present invention is to provide an internal combustion engine wherein the discharged amount of unburned gas components of combustion can be reduced.

According to the present invention, in an internal combustion engine comprising a cylinder, a piston, an intake means, an exhaust means, a fuel injector, a fuel supply means, and an ignition means, the fuel injector generates a fuel spray which has a cut out portion, in which the fuel spray is thin in a peripheral direction, as seen in lateral cross-section across a valve axial line of the fuel spray, and injects the cut-out portion in which the fuel spray is thin toward a side of the piston, and the air taken in from the intake means is caused to flow toward a side of the piston of the fuel spray to a side of the ignition plug.

The fuel injector has a large fuel spray angle at the side of the ignition means and a small fuel spray angle at the side of the piston. The fuel injector has an orifice plate, in which a fuel injection hole penetrates the orifice plate in a plate thickness direction, and a fuel spray formation plate for forming the cut-out portion of the fuel spray at an outlet portion of the fuel injector.

The fuel injector generates a fuel spray which has a cut-out portion whereby the fuel spray is thin in a peripheral direction, as seen in lateral cross-section across a valve axial line of the fuel spray, and injects at least two times the cut-out portion in which the fuel spray is thin toward a side of the piston, during one time timing.

Under a state consisting of a high load and a low rotation, during an intake stroke, the fuel is divided into plural parts injected from the fuel injector; and, under a state of a low load and a low rotation, during a compression stroke, the fuel is divided into plural parts injected from the fuel injector.

According to the present invention, a large fuel particle distribution is formed in a surrounding portion of an ignition means, and the distribution of an air-fuel mixture of a combustible concentration is heightened. Also, the air-fuel mixture is retained for a long period. Accordingly, an enlargement of the combustion stability range can be attained.

Further, the fuel particle distribution in the piston direction is made small and the fuel adhesion is restrained; accordingly, the unburned gas components (HC, CO) of the combustion can be reduced. For this reason, as to the fuel spray injected by a fuel injector, the fuel spray angle is made large on the ignition means side, and the fuel spray angle becomes narrow on the piston side. Thus, the and a fuel spray portion having the large fuel spray angle is injected to an opposed side of the piston from a spark generation portion of the ignition means.

At this time, the fuel spray injected from the spark generation portion and directed to the opposed side of the piston can be formed with a good air-fuel mixture having the good combustible concentration by inducing the surrounding air therein.

The change of a fuel spray shape according to a change in cylinder-in pressure is made small, and the combustion stability performance in a wide region from a low engine speed to a high engine speed can be assured. For this reason, a part of the fuel spray cross-section is cut out or cut off, and a pressure difference in an inner portion of the fuel spray and an outer portion of the fuel spray is made small. Accordingly, the fuel spray hardly can be crushed.

BRIEF DESCRIPTION OF THE DRAWINGS

FIG. 2($b$) is a diagram showing a cross-section of a fuel spray;

FIGS. 7($b$) and 7($c$) are graphs showing a relationship between a tumble strength and an exhaust air for HC and NOx, respectively;

FIG. 10($b$) is an end view of the nozzle as seen in the direction N in FIG. 10($a$);

FIGS. 11($a$)(1) and 11($a$)(2) are graphs showing a relationship between a fuel swirl number and a fuel spray angle;

FIGS. 11($b$)(1) and 11($b$)(2) are front and side views, respectively, of a fuel swirl element, and FIG. 11($b$)(3) is a cross-sectional view of the nozzle tip end;

FIG. 12($c$) is a cross-section of the nozzle tip end showing the spray deflection angle;

FIG. 14($b$) is an end view of the nozzle as seen in the direction P in FIG. 14($a$);

FIGS. 16($a$) through 16($f$) are diagrams showing the formation of an orifice plate having a fuel injection hole;

FIG. 23 is a cross-sectional view of a cylinder of an internal combustion engine;

FIG. 24($a$) is a schematic diagram showing the constitution of a drive circuit, and FIG. 24($b$) is a fuel injection timing diagram; and FIG. 25($a$) is a fuel injection signal diagram, and FIG. 25($b$) is a graph showing a combustion stability range.

DETAILED DESCRIPTION OF THE INVENTION

One embodiment of an internal combustion engine having a fuel injector according to the present invention will be explained with reference to FIG. 1 to FIG. 7($c$).

Further, in the explanation hereinafter, a condition wherein a cylinder is arranged along a center axis of a cylinder of an internal combustion engine, in other words in the direction of movement of a piston, will be explained by way of example, however the arrangement of the cylinder is not limited to this direction.

Figure 1:
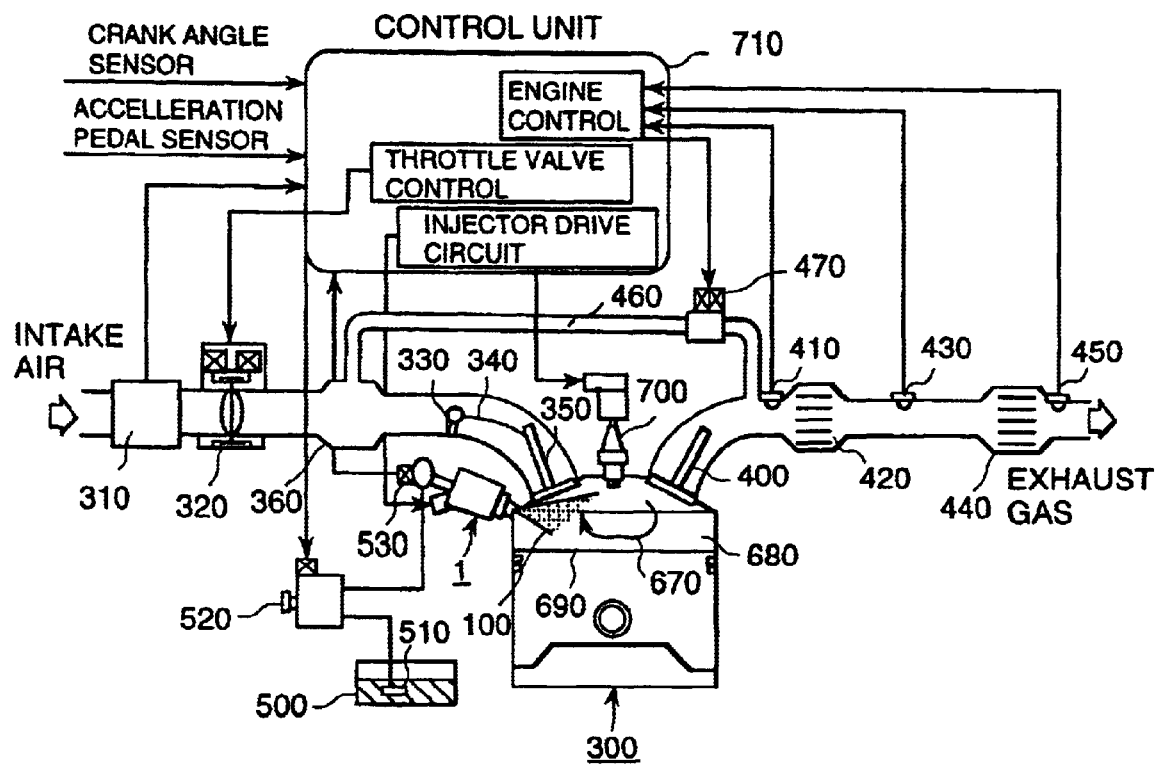
FIG. 1 is a schematic diagram showing an internal combustion engine system according to the present invention.

FIG. 1 is a schematic diagram of a control system of an internal combustion engine on which a fuel injector 1 is mounted.

an intake air system comprises an air flow sensor 310 for measuring an intake air amount, an electronically controlled throttle 320 for controlling the air amount, an air fluidity control valve 330 for generating a tumble flow of air in a cylinder 680, a partition plate 340 (this is called a two stage port) for dividing a downstream passage of the air fluidity control valve 330, and an intake valve 350.

On the other hand, an exhaust air system is installed successively on the downstream side of an exhaust valve 400, and it comprises an air-fuel ratio sensor 410, a threeway catalyst 420, an exhaust air temperature sensor 430, NOx catalyst 440, and an oxygen concentration sensor 450.

Further, from an upstream side of the air-fuel ratio sensor 410 to an intake pipe collector 360, a passage 460 for circulating a part of the exhaust gas of combustion is provided to restrain the discharge amount of NOx by effecting a re-circulation of the exhaust gas. At a point midway of this passage 460, an EGR valve 470 for controlling the amount of the exhaust gas being circulated is provided.

A fuel system comprises a low pressure feed pump 510 for sucking up fuel from a fuel tank 500, a compact type high pressure pump 520 for pressuring the low pressure fuel at once and for supplying the fuel to a fuel injector 1, and a fuel sensor 530 for measuring the fuel temperature.

A piston 690 provided in the cylinder of an internal combustion engine 300 has a flat shape with no surface cavity. A swirl flow 670 is produced in a cylinder 680 in the form of a tumble flow which flows into the intake valve 350 and is directed toward the exhaust valve 400 and the piston 690. The fuel injector 1 is provided in a wall under the intake valve 350 with an angle of about 40 degrees from a horizontal plane. A fuel spray 100 is produces as a deflection fuel spray having a thick fuel spray component which has a wide spread angle in the direction of an ignition plug 700. A method of forming the fuel spray will be explained later.

A control unit 710 sends signals to the electronically controlled throttle 320, the fuel injector 1, the EGR valve 470, etc. on the basis of operation information, such as crank angle etc., of the internal combustion engine, the position of an acceleration pedal sensor, and the outputs of the air-fuel sensor 310, the fuel temperature sensor 520 and various kinds sensors in the exhaust air system. In response thereto, the control unit 710 suitably controls the combustion in the internal combustion engine.

With respect to a combustion control method, there are two general methods of classification including stratification combustion and homogeneous combustion.

The stratification combustion is a combustion method in which, under a condition in which the pressure in the cylinder 680 during the last half of the compression stroke is raised, the fuel is injected, and a combustible air-fuel mixture is gathered in the vicinity of the ignition plug 700, so that the fuel spray can be stratified and ignited. Since the fuel spray is stratified, the combustion is carried out with a thin air-fuel ratio of about 40 degrees in the cylinder 680; accordingly, the fuel consumption can be improved.

The homogenous combustion is a combustion method in which, after the fuel is mixed homogeneously during an intake stroke, the ignition is carried out. Since the fuel is injected to form a stoichiometric air-fuel ratio in the whole cylinder 680, in comparison with the that of the stratification lean burn method, a high output operation can be carried out.

FIG. 2(*a*) is an enlarged view of the cylinder of an internal combustion engine 300, in which the fuel spray 100 is injected into the cylinder of a flat piston engine, and the relation between the fuel spray and the tumble 670 is shown, wherein the tumble flow is introduced into an interior portion of the fuel spray 100.

The fuel spray 100 (A in FIG. 2(*b*)) has a strong swirl force so as to be injected in a direction toward the ignition plug 700, or a surrounding portion of the ignition plug 700, so that it can reach the ignition plug 700 without the support of the tumble flow 670; however, with the tumble 670, it flows to the ignition plug 700 while being supported and riding on the tumble flow 670.

Further, as to the portion of the fuel spray 100 injected toward the piston 690, the tumble 670 acts as a little resistance, so that the force for directing the fuel toward the piston 690 is restrained, since the path of the fuel spray 100 to the piston 690 is obstructed by the tumble flow. Thus, the fuel adhesion on the piston can be reduced.

Further, characteristically, a part of the fuel spray having a narrow angle and a wide spread of the fuel spray 100 in the piston direction 690 is cut out or cut off, so that the entering of air into the interior portion of the fuel spray 100 can be promoted. Accordingly, the force directing the fuel to the piston 690 is restrained, and the path thereof to the piston 690 is obstructed, so that the fuel adhesion can be reduced.

Figure 3:
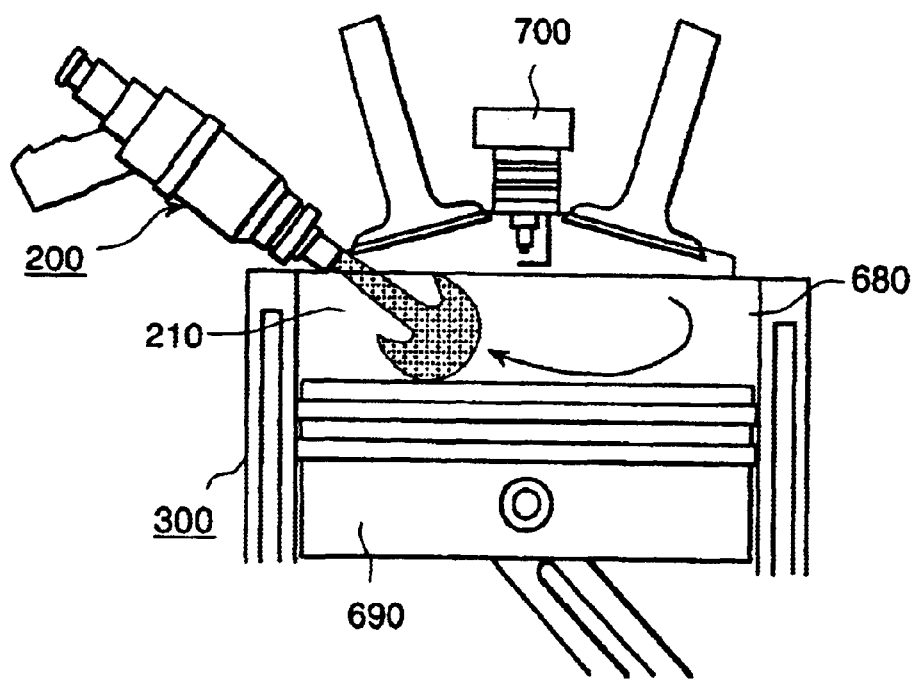
FIG. 3 is a cross-sectional view showing a cylinder of an internal combustion engine according to the prior art.

FIG. 3 is a view of a cylinder in which a hollow cone-shaped fuel spray produced by a conventional fuel injector 200, having a straight fuel injection port, is injected when the pressure in the cylinder 680 is raised. In this case, the fuel spray is crushed, and a compact fuel spray 210 having a narrow fuel spray angle is formed. When this fuel spray collides with a cavity on top of the piston and is stratified, there is an advantage in that the fuel spray received in the cavity on top of the piston is stratified easily.

However, in a flat type piston, as shown in FIG. 3, since the fuel spray collides with a normal tumble flow and is interfered with, the stratification of the fuel is difficult to achieve. Further, since a combustible air-fuel mixture is hardly formed in the area surrounding the ignition plug 700, there the problems in that a range in which a spark must be produced becomes narrow and the combustion stability range becomes narrow.

Figure 4:
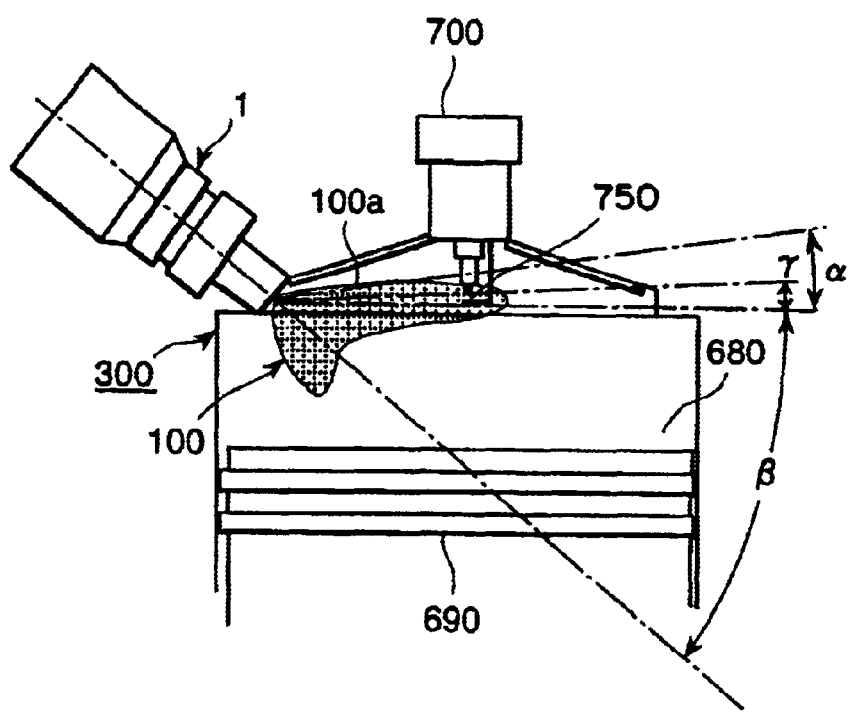
FIG. 4 is a cross-sectional view showing a positional relationship between a fuel spray and an ignition plug in a cylinder of an internal combustion engine according to the present invention.

FIG. 4 shows an installation layout according to the present invention. To accommodate different kinds of internal combustion engines 300, the installing angle β of the fuel injector 1 falls in a range of 20–40 degrees. A spark generating area 750 of the ignition plug 700 is installed with 0–γ° (about 5 degrees) degrees relative to a horizontal line (a direction crossing at a right angle with the direction of movement of the piston) drawn from the center of the fuel injection port of the fuel injector 1.

An angle formed by line tangent to an outer edge portion 100*a* of the deflection fuel spray 100 that is injected from the fuel injector 1 and said above stated horizontal line, namely an angle α in the ignition plug direction 700, is set to be lower than 10 degrees. A sum of these angles α and β is called the deflection angle.

According to this embodiment, the angle of the fuel spray injected from the fuel injector 1 is large in the direction of the ignition plug 700 and the fuel spray angle is narrow in the direction toward the piston, and, further, the fuel spray portion on the large fuel spray angle side is injected so as to extend to an opposite side of the piston 690 from the spark generation area 750. The fuel spray injected from the spark generation area 750 to the opposite side to the piston 690 incorporates the surrounding air, and, accordingly, a air-fuel mixture having a good combustible concentration can be formed at the spark generation area 750.

Figure 5:
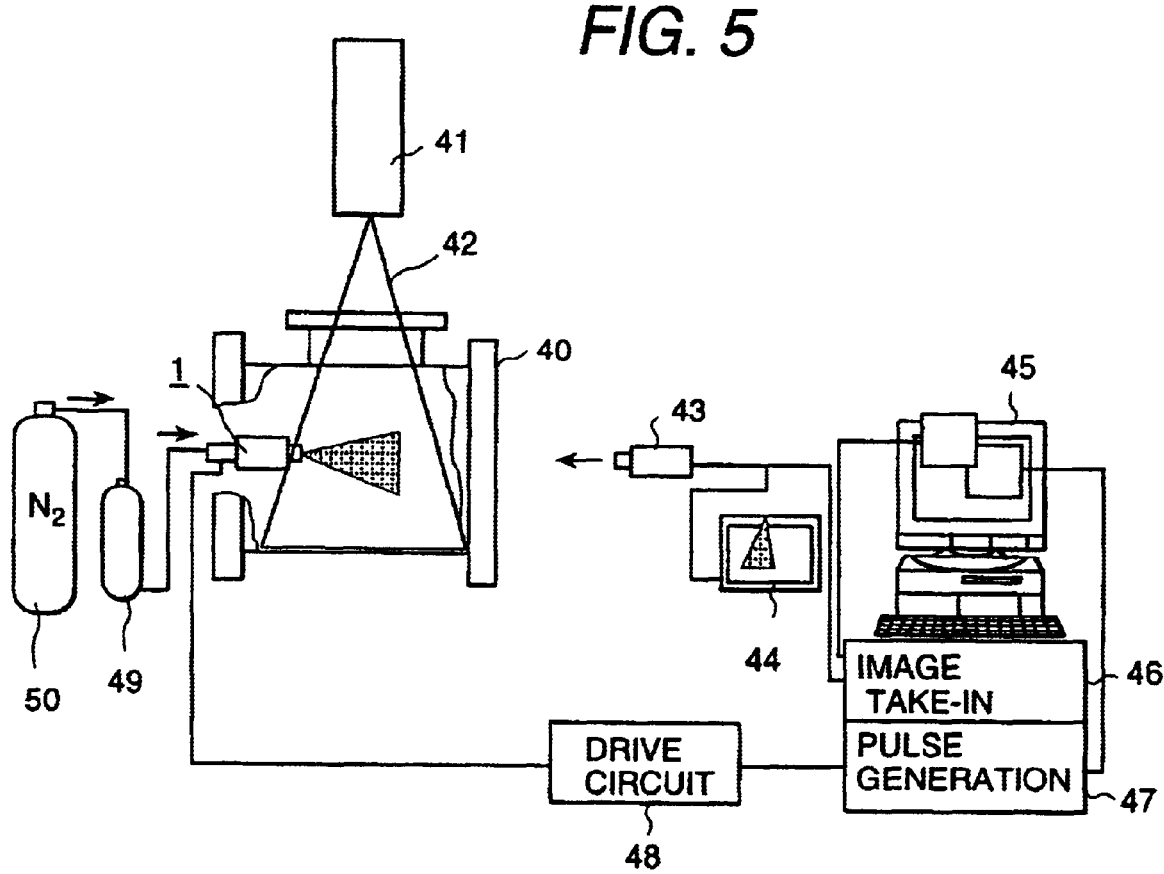
FIG. 5 is a schematic diagram showing one example of a fuel spray measurement means.

FIG. 5 shows an apparatus for measurement of the above-stated fuel spray. The reference numeral 40 indicates a cylindrical-shaped fuel spray vessel having optical glasses on three side faces thereof and the fuel injector 1 installed at the fourth side face. A laser 41 generates a light beam 42 by means of a slit which is provided in a light generation portion, and the light beam is rotated so as to radiate in both longitudinal and lateral cross-sectional directions of the fuel spray.

Further, along two side faces, a video camera 43, capable of adjustment in a zoom direction and in left and right directions is provided to view the fuel spray on a monitor 44, so that the fuel spray can be observed. Further, reference numeral 45 indicates a micro-processor, and this micro-processor 45 comprises an image input means 46 and a pulse generation unit 47 for supplying an opening command view a drive circuit 48 to the fuel injector 1. Reference numeral 49 denotes a fuel tank which is pressurized and adjusted according to an $N_2$ bomb 50. During an experiment, a liquid having the characteristic that resembles gasoline is used as an alternative to gasoline. The pressure in the vessel can be set to a reduced pressure or an increased pressure by using a vacuum pump or the $N_2$ bomb.

A main operating procedure comprises setting an opening valve command to be sent to the fuel injector 100→setting a timing for irradiating a laser beam→setting the laser beam position→accessing the image signal software→outputting the opening valve command→inputting an image signal→storing image data. Using this measurement apparatus, a fuel spray direction (a deflection angle) of the deflection angle injected from the fuel injector 1 and the distance (penetration) can be set to most suitable values for various kinds of internal combustion engines.

Each of FIG. 6 and FIGS. 7(a) to 7(c) shows one example of the results of the above-stated processing.

Figure 6:
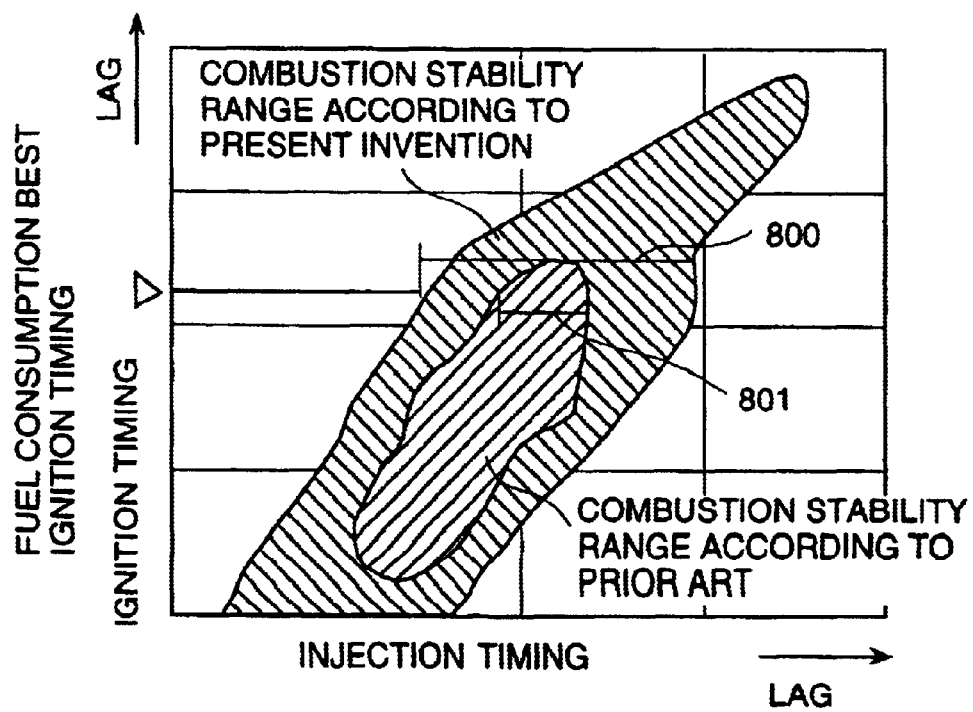
FIG. 6 is a graph showing a combustion stability range.

FIG. 6 is a graph which shows a combustion stability range in a case in which injection timing is shown on a horizontal axis and ignition timing is shown on a vertical axis. In the conventional fuel spray or the conventional internal combustion engine, a combustion stability range 801 in the ignition timing where the fuel consumption becomes best is very narrow. For this reason, because of the conditions associated with individual machine differences in the fuel injectors and the time lapse change, it is difficult to stabilize the combustion.

Further, when the engine speed becomes high, there is necessarily a large crank angle between injection and ignition. In this regard, with an increase in the speed, the movement of the piston becomes rapid; and, in addition to this, with an increase in the air pressure in the cylinder, the fuel spray withers and the movement of the piston becomes late (lags).

In this embodiment of the invention, since the deflection fuel spray directed toward the ignition plug is not changed very much in response to an increase in the air pressure in the cylinder, the conventional problems can be solved, since the combustion stability range 800, as seen in FIG. 6, becomes wide, the conditions resulting from individual machine differences change only a little, and it is possible to carry out a stable combustion. Further, it is possible to carry out a stable combustion regardless of the engine speed of the internal combustion engine.

Figure 7A:
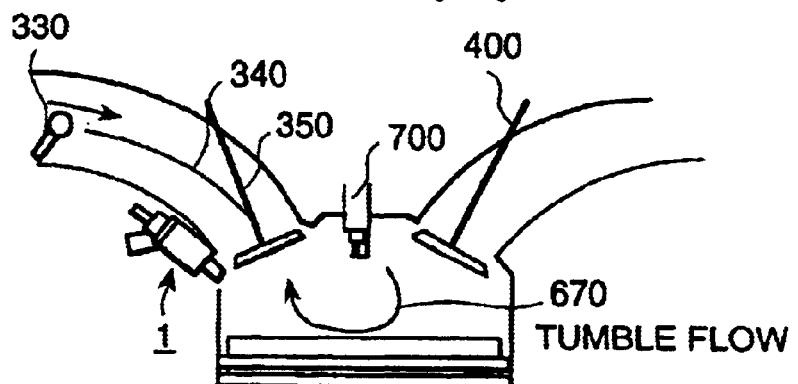
FIG. 7($a$) is a cross-sectional view of a cylinder in an internal combustion engine.
Figure 7B:
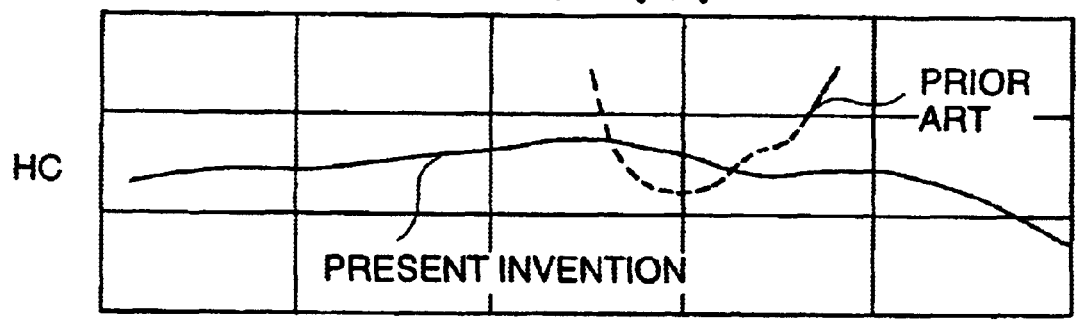
Figure 7C:
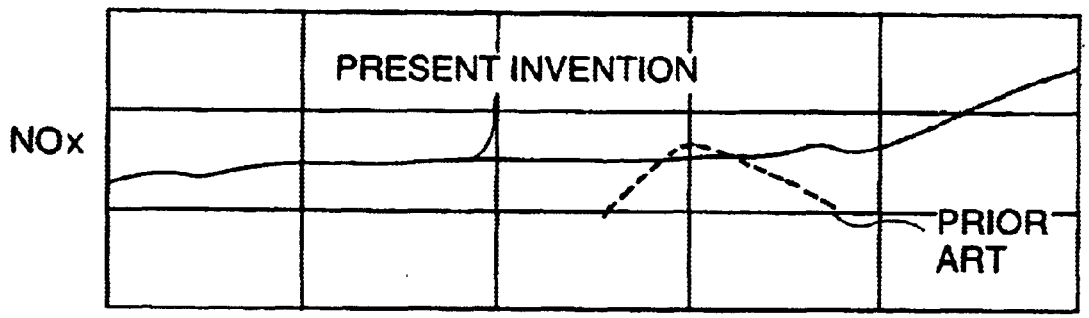

FIGS. 7(b) and 7(c) show an affect of the tumble fluidization, in which the strength of the tumble 760 generated in the cylinder is shown on the horizontal axis and HC (the unburned hydrocarbon) and NOx are shown on the vertical axis, respectively. The strength of the tumble flow 670, as seen in FIG. 7(a), is adjusted by an opening area of a passage on the lower side of the partition plate 340, according to the opening degree of the air fluidization control valve 330.

In the conventional fuel spray and in the conventional internal combustion engine, to introduce the combustible air-fuel mixture to the ignition plug 700, a cavity is provided on the top of the piston by which the fuel spray is guided, and as the pressure is raised, the withered fuel spray is lifted up by the tumble flow. For this reason, since it is necessary to have a desirable value of tumble flow strength, or a large value to some degree, in the narrow range, it is impossible to obtain a region having a good exhaust performance. Since the fuel spray is confined in the cavity of the piston, the fuel tends to adhere to a wall face of the piston, and an afterburning combustion occurs whereby the region becomes narrow.

In this embodiment of the invention, since the deflection fuel spray directed toward the ignition plug is not changed very much in response to an increase in the air pressure, the conventional problems can be solved; accordingly, an exhaust performance having the good range exists in general.

In particular, even though the tumble flow 670 changes, since the exhaust performance is not controlled to a large extent, effects for simplifying the intake air control system can be obtained, namely the partition plate can be abolished and the air fluidization control valve 330 can be limited to carry out only "ON-OFF" control.

Next, embodiments of various kinds of the fuel injectors for producing the above-described deflection fuel spray will be explained.

Figure 8:
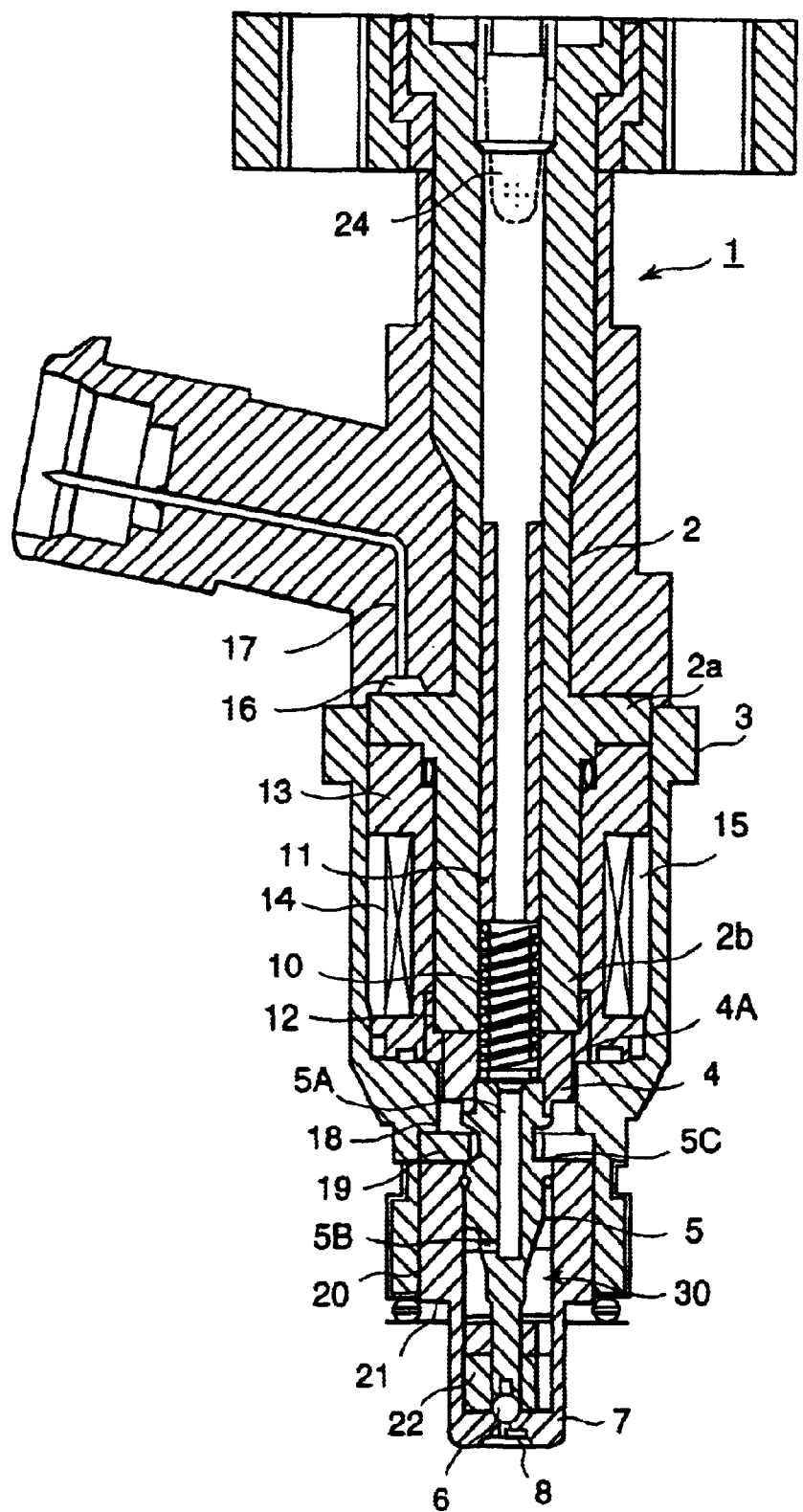
FIG. 8 is a longitudinal cross-sectional view of a high voltage drive fuel injector.

FIG. 8 is a longitudinal cross-sectional view of an electromagnetic type fuel injector 1. The construction and an operation of the electromagnetic type fuel injector 1 will be explained.

In the electromagnetic type fuel injector 1, in response to an ON-OFF signal having a duty cycle established by a control unit, an opening and a closing of a seat portion of the fuel injector is carried out, whereby the fuel is injected. A magnetic circuit is formed by a yoke 3, a core 2 having a shield body portion 2a for closing an opening end of the yoke 3 and a pillar-shaped portion 2b extending toward a center portion of the yoke 3, and an anchor 4 facing the core 2 and separated therefrom by spacing an air gap.

In a center of the pillar-shaped portion 2b of the core 2, a valve body 30 is provided, comprising the anchor 4 and a rod 5 having a ball 6 mounted at the end thereof, which ball 6 is biased under pressure into contact with a seat face 9 on an upstream side of a fuel injection hole 8 provided in a nozzle member 7 for controlling the passage of the fuel. The value body 30 is biased by a spring member 10 acting as an elastic body member provided in a hole 4A. The valve body 30 is driven as one body with the anchor 4, the rod 5 and the ball 6 between a displaced position and a position in contact with the valve seat of the nozzle member 7 for opening and closing the fuel passage.

Further, an upper end of the spring member 10 in contact with a lower end of a spring member adjuster 11, which is inserted in a center bore of the core 2 to adjust the spring member to a set load. In a gap portion which faces to a side of the pillar-shaped portion 2b of the core 2 and a side of the valve body 30 of the yoke 3, to prevent the flow-out of fuel toward the side of a coil 14, a seal ring 12 is fixed mechanically in the gap portion.

The coil 14 for exciting the magnetic circuit is wound on a bobbin 13, and the outer periphery thereof is molded by a plastic body member. A terminal 17 of a coil assembly body 15 constituted by these components is inserted in a hole which is provided at a rim portion 2a of the core 2. The terminal 17 is combined with a terminal of the control unit, which is not shown in the figure.

Within the yoke 3, a plunger receiving space 18 for receiving the valve body 30 is provided, and a nozzle receiving portion 20, having a diameter larger than that of the plunger receiving portion 18 for accommodating a stopper 19 and a nozzle portion member 7, penetrates through to a tip end of the yoke 3.

In the valve body 30, which comprises the anchor 4 of magnetic material, the rod 5 having one end thereof formed integrally with the anchor 4, and the ball 6 joined to the other tip end portion of the rod 5, and a side of the anchor 4 of the rod 5, a cavity portion 5A is provided for permitting the passing-through of the fuel. Connected to the cavity portion 5A, a flow-out port 5B for passage of the fuel is provided.

Further, since the outer periphery of the anchor 4 contacts the seal ring 12, movement of the valve body 30 in the axial direction is guided thereby, and the vicinity of the tip end of the rod 5, to which the ball 6 is joined, is guided by an inner peripheral face 23 of a fuel swirl element 22, which is inserted into an inner wall 21 of a hollow portion of the nozzle member 7. Downstream of the fuel swirl element 22 for guiding the end portion of the rod 5, to which the ball 6 is joined, a seat face 9 on which the ball 6 is seated is formed on the nozzle member 7. At a central portion downstream of the seat face 9, a fuel injection hole 8 for permitting the fuel to pass through is provided.

Further, the stroke (the amount of movement in an axial upper portion in FIG. 1) of the valve body 30 is set according to a gap between a receiving face 5C of a neck portion of the rod 5 and the stopper 19. Further, a filter 24 is provided to prevent dust and foreign matters in the fuel and the piping from flowing toward the valve seat and passing between the ball 6 and the seat face 9.

Figure 9:
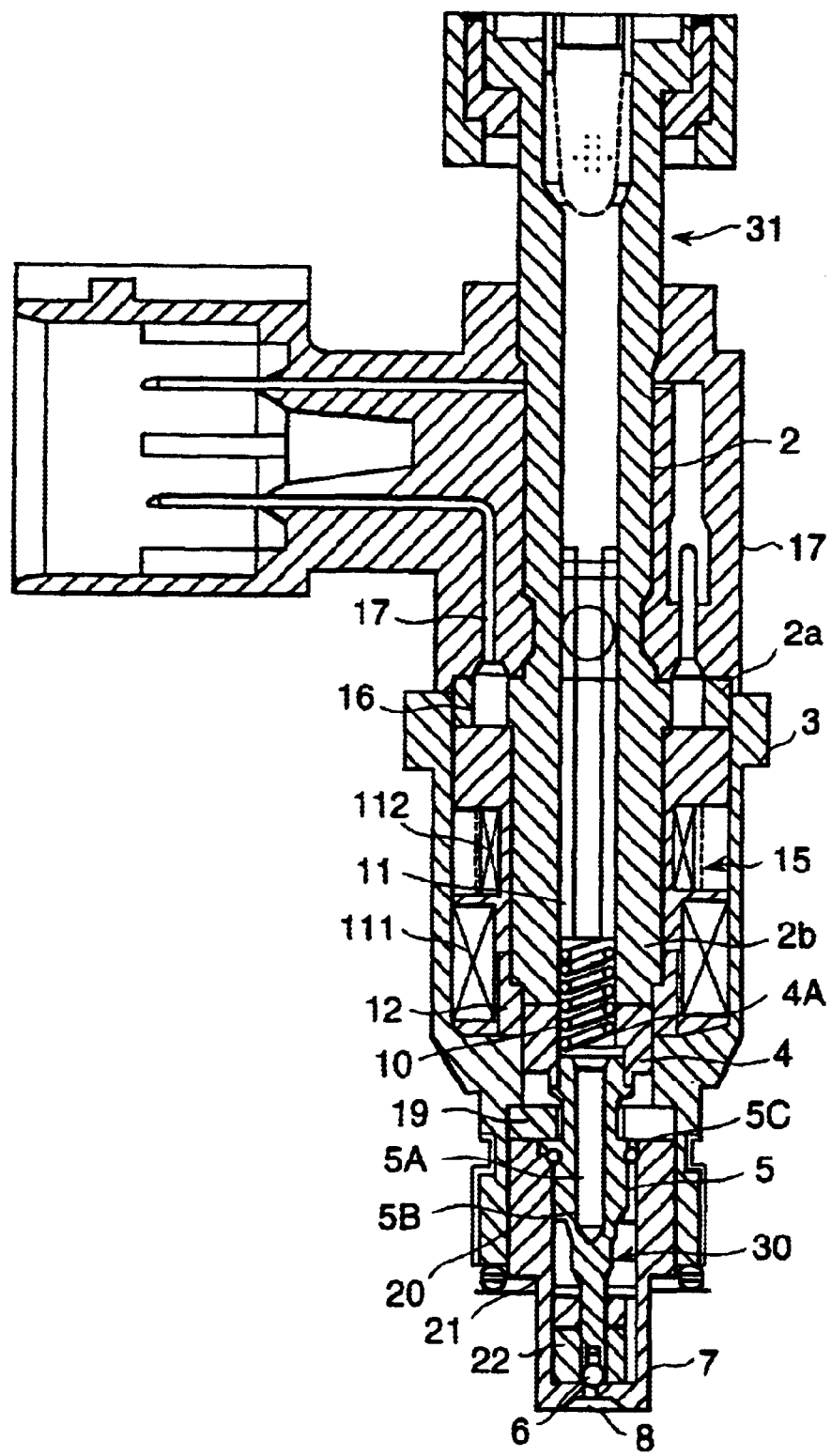
FIG. 9 is a longitudinal cross-sectional view of a battery voltage drive fuel injector.

FIG. 9 shows a fuel injector 31 having two coils comprised of a control coil 111 and a hold coil 112 which operate as a means for generating a drive force for the valve body 30. Other features of the construction, except for the coil portion, have the same or a similar function to that of the fuel injector shown in FIG. 8. The characteristic of this fuel injector 31 consists of the fact that it is driven by a battery voltage.

Further, by provision of the control coil 11, since the responsiveness of the electromagnetic control can be heightened, and by provision of the hold coil 112, since a reduction of a holding electric power is achieved, the fuel can be injected to a low injection amount region with a good accuracy. Further, a characteristic is produced in which the consumption of electric power can be reduced.

Figure 10A:
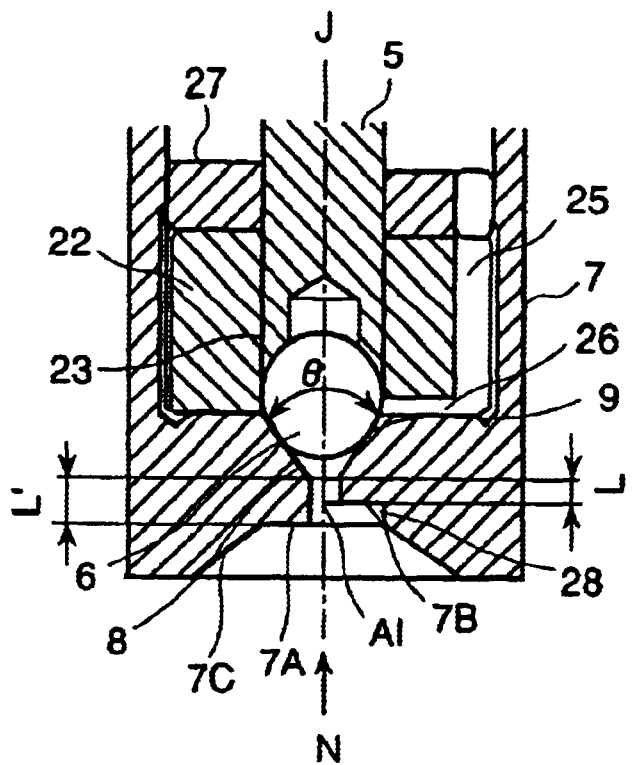
FIG. 10($a$) is an enlarged longitudinal cross-sectional view showing a tip end of a nozzle.

Next, referring to FIGS. 10(*a*) and 10(*b*), the nozzle member 7 having an L-shaped cut-out face structure (an L-shaped cut-off face structure) will be explained. FIG. 10(*a*) is an enlarged cross-sectional view of the electromagnetic type fuel injector 1 or 31 showing the nozzle member 7 portion, and FIG. 10(*b*) is an end view as seen in the direction of the arrow N in FIG. 10(*a*).

The center of the fuel injection hole 8 coincides with an axial line J (a valve axial center) of the valve body 5, and the wall face of the fuel injection hole 8 is formed to be in parallel with the axial line J (the valve axial center) of the valve body 5. The injection hole 8 is formed with a diameter of do. Further, the seat face 9 of the nozzle member 7 is formed with a seat angle of θ.

In an outlet portion of the fuel injection hole 8, an L-type cut-out portion (an L-shaped cut-off portion) 28 is constituted by faces 7A and 7B, which are orthogonal with the axial line J, and a face A1 which is substantially parallel to the axial line J and orthogonal to the face 7B. The L-type cut-off portion 28 constitutes a means for relieving the restriction of fuel flow in the direction across the valve shaft of the fuel being injected. A taper face 7C, which is joined to the face 7A, can absorb the shock sound of the valve body 5 and has a function of improving the rigidity performance.

In the above-stated description of the structure, the term "cut-off" has been used in the description of the cut-off face Al etc., but this term is not limited to the processing method, but refers to the shape in which a part thereof is cut out; as a result, it is not limited to a subject which is processed by actually cutting-offf material using a cutting processing etc. Namely, it is possible to employ a press processing (an elastic processing) using a die member or a processing using a forging processing. Further, the ball 6 is not necessarily limited to a spherical shape, but a cone shape needle valve may be employed.

Further, as seen in FIG. 10(*a*), there is provided in the fuel swirl element 22, an axial direction groove 25, in which an outer peripheral portion of the fuel swirl element 22 is formed to a flat face setting, and a radial direction groove 26. In this embodiment, the axial direction groove 25 is formed with a flat face, but it also can be formed with other shapes, such as a circular passage etc.

The above-stated axial direction groove 25 and the radial direction groove 26 are fuel passages in which the fuel is introduced from an upper portion of the fuel swirl element 22. The fuel which has passed through the axial direction groove 25 is introduced eccentrically from an axial center in the radial direction groove 26, so that the fuel as a swirl imparted thereto, whereby during the injection of the fuel from the fuel injection hole 8 provided on the nozzle member 7, the atomization performance in the fuel can be promoted. The fuel swirl element 22 is pressed and fixed under pressure against an inner peripheral face of the nozzle member 7.

Herein, the swirl strength (a swirl number S) imparted by the fuel swirl element 22 is established according to the following equation.

$$S = \text{(angular movement amount)}/\text{(fuel injection axial direction movement amount)} \times \text{(fuel injection hole diameter)}) = 2 \times do \times Ls / n \times ds^2 \times \cos\theta s \quad \text{<Formula 1>}$$

herein, do=fuel injection hole diameter

Ls=groove eccentric amount (a distance between a valve axial center and a groove (width) center)

n=groove number s=valve seat angle/2 ds=flow equivalent diameter expressed using a groove width W and a groove height H=2×W×H/W+H (see FIG. 11(*b*)(1) to 11(*b*)(3))

When the swirl number S is large, the atomization is promoted and then the fuel spray is dispersed.

An example of the operation of the fuel injector with the above-stated construction will be explained. In response to an electric ON and OFF signal supplied to the electromagnetic coil 14, the valve body 30 is moved toward an upper side against the bias spring 10 and is allowed to return to the lower side in the axial direction so that an opening or a closing of the space between the ball 6 and the seat face 9 is carried out, whereby injection control of the fuel is carried out.

When the electric signal is imparted to the coil 14, the core 2, the yoke 3 and the anchor 4 a magnetic circuit so that the anchor 4 is attracted to the core 2. When the anchor 4 is moved, the ball 6 which is formed integrally with the anchor 4 is moved against the bias of spray member 10 and the ball 6 is separated from the seat face 9 of the valve seat of the nozzle member 7, so that the fuel passage is opened on the upstream side of the fuel injection hole 8.

The fuel flows into the interior portion of the fuel injector 1 from a filter 24 and passes through an interior passage of the core 2, an outer peripheral portion of the anchor 4, a cavity portion 5A which is formed in the anchor 4 for permitting the fuel to pass through, and a fuel flow-out port 5B, and it reaches the downstream end of the injector. The fuel then passes through a further space between a stopper 19 and the rod 5, the axial direction fuel passage 25 of the fuel swirl element 22, the radial direction fuel passage 26 of the fuel swirl element 22 and is swirl-supplied to the seat portion, whereby the fuel is injected from the fuel injector 8 during the opening valve time.

Next, referring to FIGS. 2(a), 2(b), FIG. 4 and FIGS. 10(a), 10(b), the fuel spray structure obtained by the fuel injector according to the present embodiment will be explained.

Figure 10B:
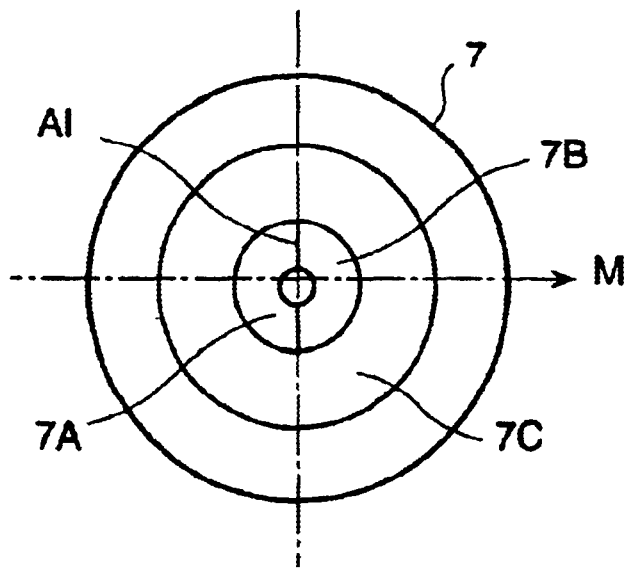

FIG. 4 is a schematic diagram in which the fuel is shown as being directly injected into the combustion chamber (the cylinder) of the internal combustion engine. As shown in this figure, the fuel spray which is injected from the fuel injector 1 of this embodiment is deflected in the direction of the ignition plug 700 and the deflection angle is shown as $\alpha+\beta$. The correspondence with the face of the nozzle member 7 shown in FIG. 10(b) is that the direction M shown in FIG. 10(b) corresponds with the deflection direction of the fuel spray.

Figure 2A:
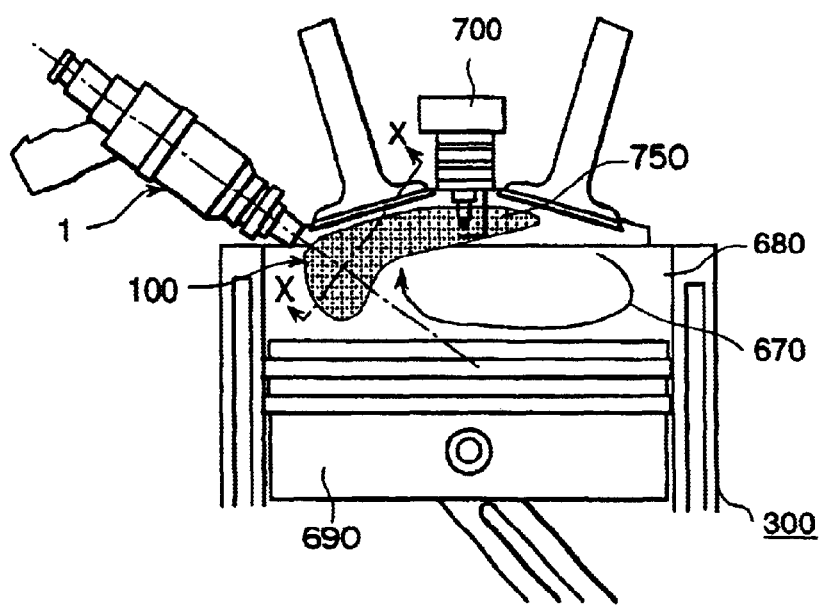
FIG. 2($a$) is a cross-sectional view showing a cylinder of an internal combustion engine according to the present invention.
Figure 2B:
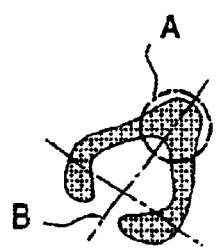

Further, as shown in FIG. 2(a), in lateral cross-section, the air-fuel mixture having a combustible concentration is thick in the direction toward the ignition plug 700, but in the direction of the piston 690, an air-fuel mixture having a combustible concentration does not exist. Namely, in the direction of the piston 690, the fuel spray has a cut-out shaped portion, as seen in FIG. 2(b). As further shown in FIG. 2(a) and FIG. 4, when the fuel injector 1 according to this embodiment is installed in the internal combustion engine 300 with the installation angle β, the air-fuel mixture stays in a surrounding portion of the ignition plug 700, which is provided on the internal combustion engine 300, whereas, on the other hand, on the piston 690 side, the air-fuel mixture becomes thin.

Since the above stated fuel spray is cut-out partially in the vicinity of the piston 690 in which the fuel spray becomes thin, even when the pressure in the cylinder 680 is changed in response to the movement of the piston 690, the pressure between the inner portion of the fuel spray and the outer portion of the fuel spray can be balanced easily. This has the advantage that the fuel spray is hardly crushed and the shape of the fuel spray is held constant.

In the generation of the above-stated fuel spray, the fuel spray is determined suitably in accordance with the inner diameter of the cylinder of the internal combustion engine, in other words, in accordance with the capacity of the internal combustion engine and the installation angle of the fuel injector. More specifically, it can be set in accordance with the size of (L'–L) and the above stated swirl number S, etc.

FIGS. 11(a)(1) and 11(a)(2) show the relationship between the swirl number S and the fuel spray angle (the deflection angle) and the penetration (the reach distance), respectively. When the swirl number S is small, the penetration becomes large, so that when the fuel injector is installed in the internal combustion engine, a problem occurs in which the fuel adheres to the face of the piston. On the other hand, when the swirl number S becomes excessively large, the fuel spray angle becomes excessively wide, so that a problem occurs in which the fuel adheres to the inner wall face of the cylinder head. However, the fuel injector of this embodiment can generate an effective deflection fuel spray having range of swirl numbers of 2–7.

Figures 12A, 12B, 12C:
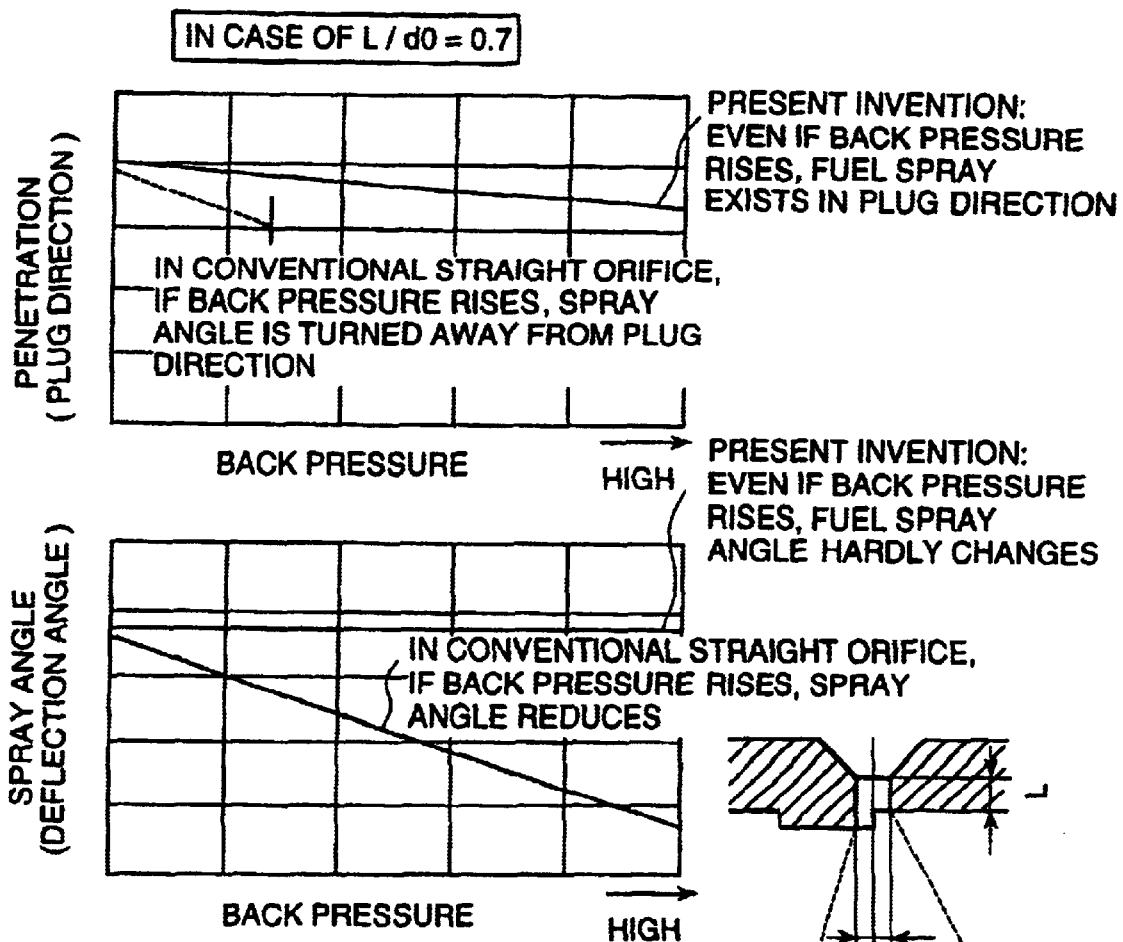
FIGS. 12($a$) and 12($b$) are graphs showing fuel spray characteristics (an affect by back pressure) for spray penetration and spray angle, respectively.

In FIGS. 12(a) to 12(c) when the swirl number is 6.7 and L/do is 0.7, the relationship between the back pressure (the atmosphere pressure) and the fuel spray angle and the penetration is shown in comparison with a fuel spray formed by an injector having a conventional straight fuel injection hole. In the injector which uses a conventional straight fuel injection hole, if the back pressure in the cylinder rises, the fuel spray withers and then the fuel spray angle becomes small.

On the other hand, with use of the fuel injector of this embodiment, even if the back pressure rises, since the pressure between the inner portion of the fuel spray and the outer portion of the fuel spray is balanced, the fuel spray angle hardly changes.

On the other hand, as to the penetration in the ignition plug direction, in the installation layout shown in FIG. 4, the comparison condition is the condition in which the fuel spray exists in the ignition plug direction. In the conventional fuel injector having a straight fuel injection hole, if the back pressure rises, it is not suitable because the fuel spray is turned away from the ignition plug direction. However, with use of the fuel injector of this embodiment, the fuel spray exists in the ignition plug direction and changes very little in response to an increase in the pressure in the cylinder. Namely, according to this embodiment, since the combustible air-fuel mixture can be maintained in a stable state in the surrounding portion of the ignition plug, the combustion stability range can be enlarged.

Next, an example of another fuel injector will be explained.

FIG. 13 to FIG. 18(b) are directed to a fuel injector in which a nozzle portion is formed so as to be thin and long. When this fuel injector is mounted on the internal combustion engine, there is a saving of space, since the fuel injector can be provided in such a way as to not interfere with other components and the cylinder head. Thus, there is the advantage of an increased degree of freedom in installing the fuel injector. Further, this structure has the advantages of at least a low cost performance due to a simplification of the performance of the components and a low cost material utilization, a sure fuel seal, a high accuracy of the fuel injection amount characteristic, a high efficiency performance of the magnetic circuit, and secondary fuel injection prevention etc.

Hereinafter, the structure and the operation of the fuel injector will be explained.

Figure 13:
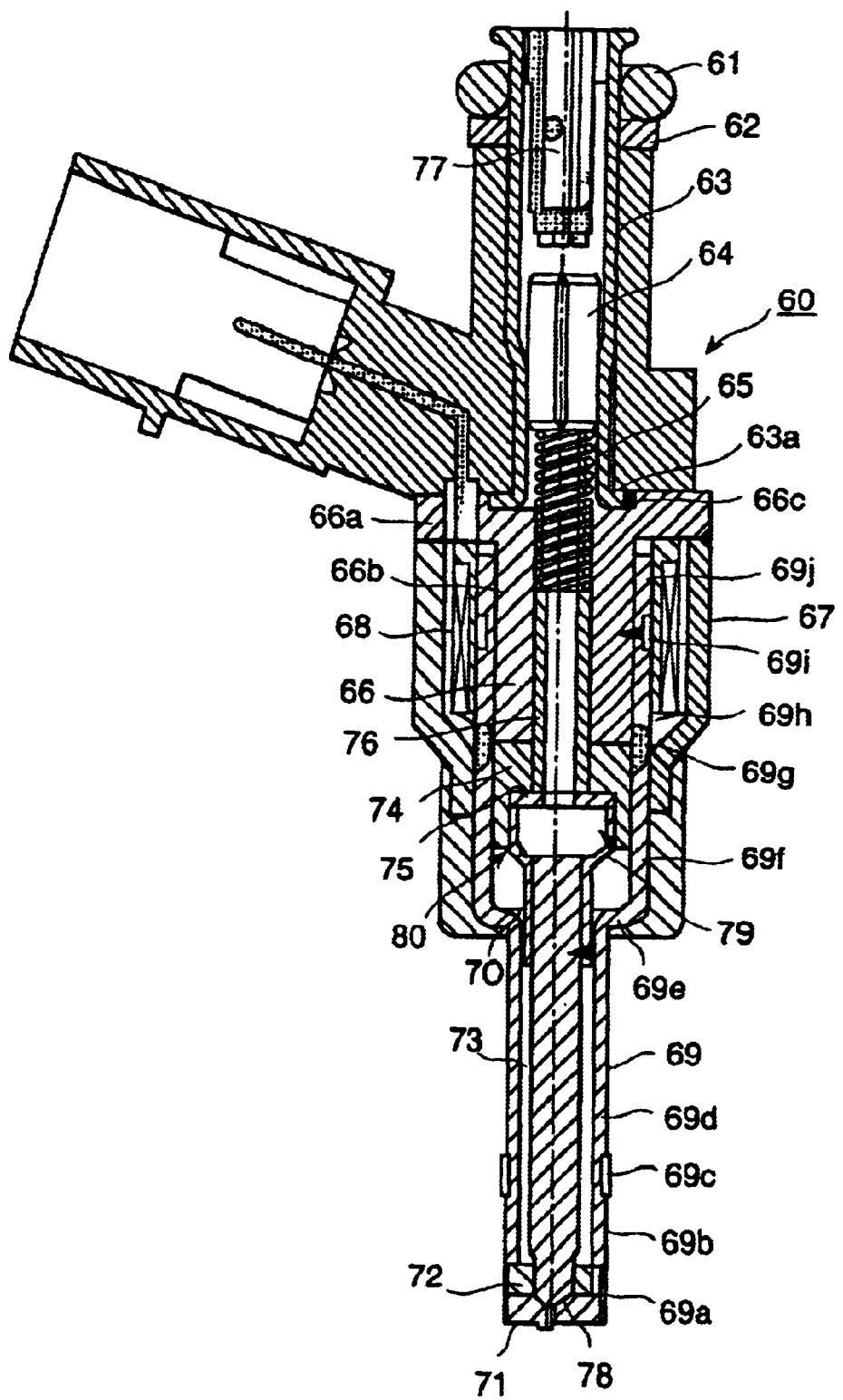
FIG. 13 is a longitudinal cross-sectional view showing a small diameter long nozzle type fuel injector.

FIG. 13 is a longitudinal cross-sectional view of a fuel injector 60. In this fuel injector 60, from a center to an outer direction, there is provided a hollow-shaped core 66 and nozzle holder 69, a coil 68, and a yoke 67. On the nozzle holder 69, a plunger 80 having a valve body is mounted in an interior portion thereof, and this plunger 80 is biased toward an orifice plate 71. The outer diameter of a hollow cylindrical portion 66a of the core 66 is formed to be larger than the inner diameter of a thin diameter portion of the nozzle holder 69.

As to a basic operation of this fuel injector 60, when the coil 68 is supplied with electric current, the yoke 67, the core 66, an anchor 74 (a part of the plunger 80) and a portion sandwiched by the anchor 74 of the nozzle holder 69 and the core 66 form a magnetic circuit; and, with the operation of this magnetic circuit, the plunger 80 is attracted against the force of a return spring member 65, so that an opening valve operation is carried out. Further, when current is cut off from the coil 66, the force of the return spring member 65 will cause the plunger 80 to move down to contact with the orifice plate 71, so that a closing valve operation is carried out.

In this embodiment, a lower end face of the core 66 works as a stopper for engaging the plunger 80 during the opening valve operation time. For this reason, on the lower end face of the core 66 and an upper end face of the anchor 74, it is preferable to carry out an electrolyte plating process, such as chrome plating.

The core 66 is comprised of a hollow cylindrical portion 66a and a hollow disc portion 66b as one body. The core 66 can be produced by press processing of a magnetic material (an electromagnetic stainless) of a stainless group and a cutting processing. The diameter of the hollow cylindrical portion 66a of the core 66 is larger than the inner diameter of the thin diameter portion of the nozzle holder 69.

A fuel connector 63 is welded to a hollow portion of the hollow disc portion 66b of the core 66. The end face of the core 66 which engages the connector pipe 63 has an enlarged surface so that a welding margin can be obtained fully. To maintain the fuel seal performance, this welding is carried out on one periphery of a joining boundary portion, for example, portion shown with reference numeral 66c, using laser welding etc.

The inner diameter of the fuel connector pipe 63 has a step-wise difference, in which a fuel filter 77 for removing dust etc., which is mingled with the fuel flowing from an upstream side of the fuel passage, and a spring press member 64 for regulating an initial load of the return spring member 65 are inserted and fixed. The step-wise difference can be formed at a low cost using pipe squeeze processing. Further, since the fuel pipe connector 63 is constituted separately from the core 66, this connector 63 can be provided with various coupling structures.

The nozzle holder 69 is made from a magnetic material of the stainless type (electro-magnetic stainless material) and has thin and long nozzle portions (from 69a to 69d). There is a step-wise difference of the anchor/core supports (from 69f to 69j) thereof, such that the inner diameter of the anchor/core supports is larger than the inner diameter of the nozzle portion and is coextensive with an outer diameter of the cylindrical portion 66a of the core 66. The nozzle holder 69 is provided integrally using a pipe squeeze processing and can be manufactured with a low cost compared with the use of cutting processing.

At the lower end (69a) of the nozzle portion of the nozzle holder 69, the orifice plate 71 and the fuel swirl element 72 are provided, and they are formed as separate members.

To a cone-shaped cut-off portion 69e of the nozzle holder 69, a Teflon seal 70 for use as a combustion gas seal is provided. This seal 70 has a step-wise portion 69e for connecting the thin diameter nozzle portions (from 69a to 69d) and the anchor/core support portions (from 69f to 69j). In this embodiment, the angle to an axial direction of the step-wise formation portion 69e is substantially 90 degrees, however the invention is not limited to this, but any angle can be employed.

The plunger 80 is constituted by a plunger rod 73, the anchor 74 and joint pipes 79 for joining the respective components. Further, between the joint pipe 79 and the anchor 74, a ring-shaped plate spring member 75 is sandwich-mounted. The joint pipe 79 is formed using pipe squeeze processing. The joint pipe 79 is inserted under pressure onto the plunger rod 73 and is fixed using laser welding.

Further, the joint pipe 79 is inserted under pressure into the anchor 74 and fixed thereto using laser welding. For this purpose, the anchor 74 has a hollow structure, and the plate spring member 75 is formed with a ring shape and an inner side thereof is a punching portion. Further, a fuel passage hole is opened in the joint pipe 79. To the plate spring member 75. One end of a mass ring 76, in the form of a cylindrical-shaped movable mass body, is pressed against the plate spray member 75. The mass ring 76 is formed, for example, of a non-magnetic stainless material to prevent a magnetic short-circuit from forming between the core 66 and the anchor 74. The mass ring 76 is positioned to extend beyond the inner end of the core 66 and into one end of the anchor 74.

A hollow hole formed in the core 66 accommodates the mass ring 76 and forms a fuel passage in which a return spring member 65 is arranged. Further, in the fuel connector pipe 63, a spring pressing member 64, for regulating an initial load of the return spring member 65, and the fuel filter 77 are provided in sequence.

The mass ring 76 is disposed so as to be movable independently between the return spring member 76 and the plunger 80 in the axial direction. To compensate for this independent movement, the plate spring member 75 is disposed between the mass ring 76 and the plunger 80, so that the plate spring member 75 can adjust the position of the mass ring 76. As stated above, the mass ring 76 operates to carry out a dynamic damper action for restraining a backlash of the plunger 80 during the closing valve operation time. This damper action occurs during the closing valve time of the plunger 80 when the plunger 80 collides with the valve seat 78 in response to the force of the return spring member 65. The plunger 80 is subjected to backlash at this time, but the kinetic energy is absorbed through the inertia of the mass ring 76, and an elastic deformation of the plate spring member 75 and the backlash to be attenuated. This damper action can bring about an extremely action effect.

Figure 14A:
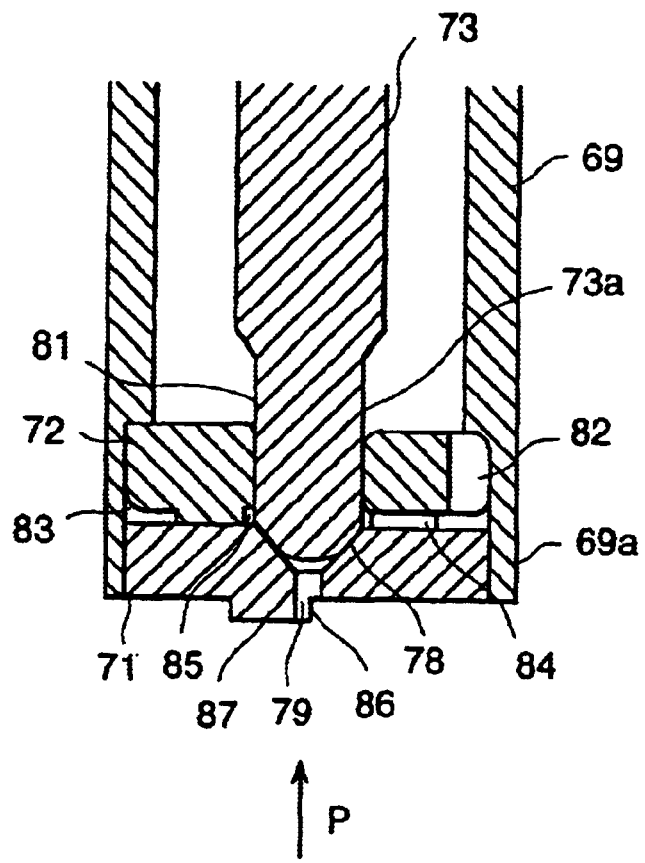
FIG. 14($a$) is an enlarged longitudinal cross-sectional view showing a tip end of a nozzle.

FIG. 14(a) is an enlarged cross-sectional view of the vicinity of the tip end of the nozzle holder 69. Referring to this figure, the method of generation of the deflection fuel spray and method of manufacture of the fuel injector according to the present invention will be explained.

At the lower end (the tip end 69a) of the nozzle portion of the nozzle holder 69, the orifice plate 71 and the fuel swirl element 72 are provided, and they are constituted of separate members. The orifice plate 71, for example, is formed of a stainless group disc chip, and a fuel injection hole 79 (an orifice) is provided at the center thereof. Upstream of the injection hole 79, the valve seat 78 is formed. The orifice plate 71 is installed under pressure into the tip end 69a of the nozzle holder 69.

The fuel swirl element 72 is also inserted under pressure into the tip end 69a of the nozzle holder 69 in a space fit-into manner and is formed of a sintering alloy, such as SUS 416. This fuel swirl element 72 is a tip shape near to a substantial disc and a central hole (a guide) 81 for slide-guiding a tip end 73a of the plunger rod 73 is provided at the center thereof. Extending from an upper face to a lower face thereof, a vertical passage 82 is provided for guiding the fuel along the outer periphery.

On the other hand, at the lower face thereof, a ring shape step-wise difference (a flow passage) 83 is formed to the outer peripheral edge, and between this ring shape passage 83 and the central hole 81, plural offset passages are formed for subjecting the fuel to a swirl flow, for example from four to six passages. To an outlet portion of the offset passage 84, a swirl chamber 85 is formed to obtain a stable swirl flow in the fuel. Further, after the insertion of the fuel swirl element 72 under pressure by pressing the orifice plate 71, the orifice plate 71 is welded and fixed in place. This welding is carried out so as to extend over one periphery of a combined boundary portion using laser welding etc. to maintain the fuel seal performance. Further, to the offset passage 84 of the fuel swirl element 72, a part (a part of the row material) of the side of the orifice plate 71 is rounded in and a rotation dent is carried out surely.

Figure 14B:
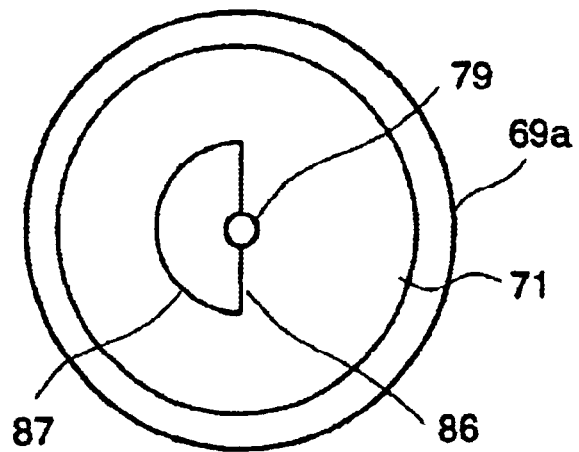

To the outlet portion of the fuel injection hole 79, a L shape cut-off portion 86 for generating the deflection fuel spray is formed. The position of the cut-off portion is provided at a portion which coincides substantially with a central position of the fuel injection hole 79. The method of formation of the cut-off portion is similar to that of the method explained with reference to FIG. 10(*a*). Further, an outlet end of the fuel injection hole 79 is constituted with a projection shape 87, as seen in FIG. 14(*b*), and this projection is formed using a structure in which the rigidity performance is heightened and a shock sound which occurs when the tip end 73*a* of the plunger rod 73 impacts the valve seat can be attenuated.

Figure 15:
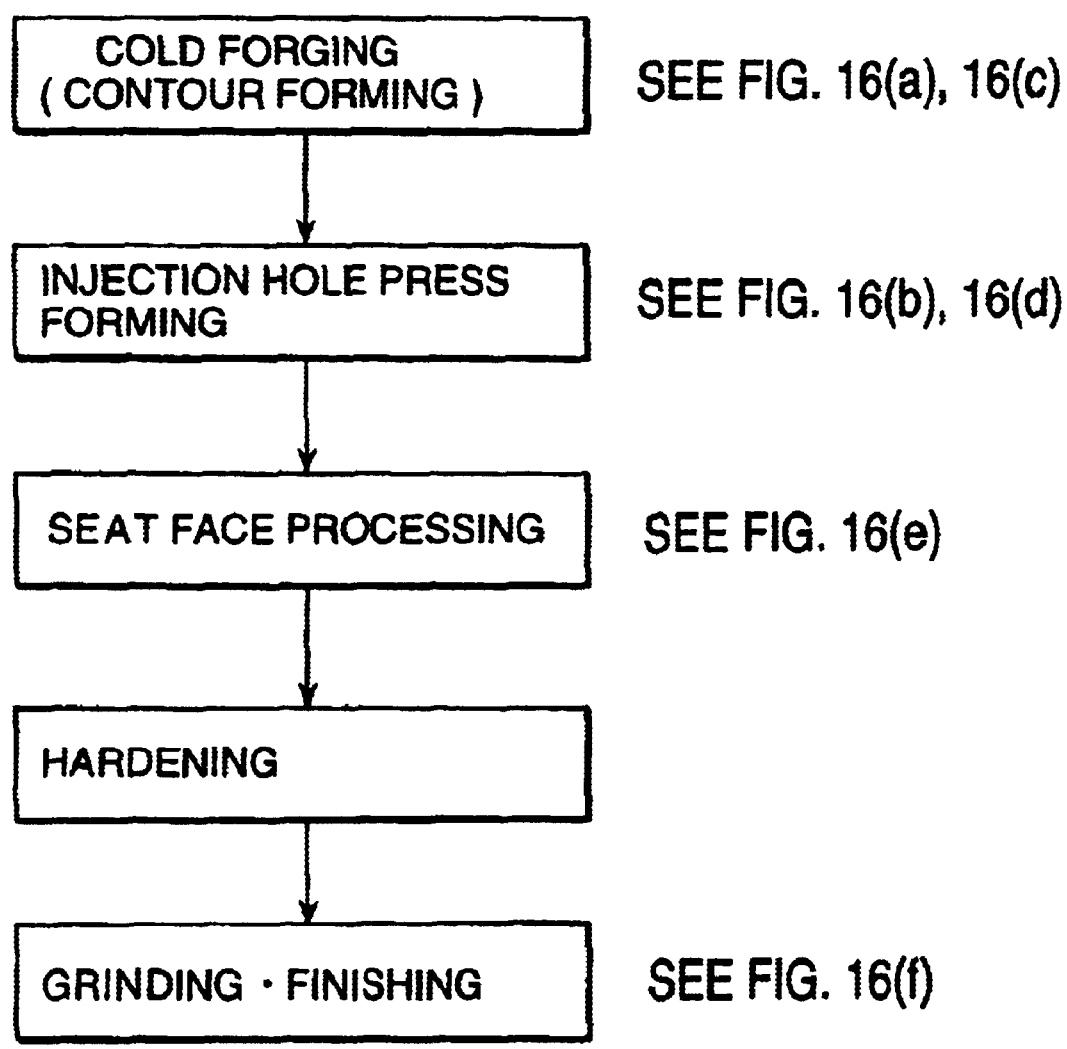
FIG. 15 is a flow diagram showing a processing of a fuel injection hole.
Figure 17A:
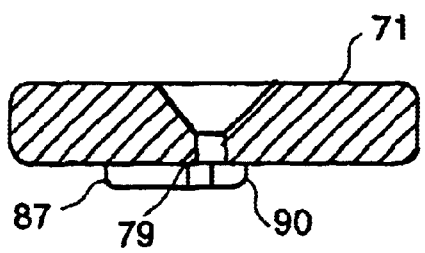
FIGS. 17($a$) through 17($e$) are diagrams showing another embodiment of the formation of an orifice plate having a fuel injection hole.
Figure 17C:
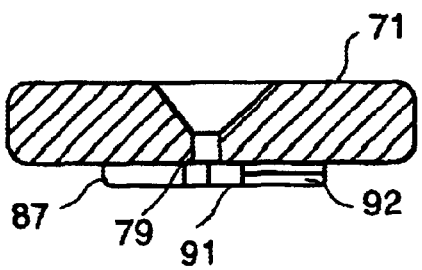
Figure 17B:
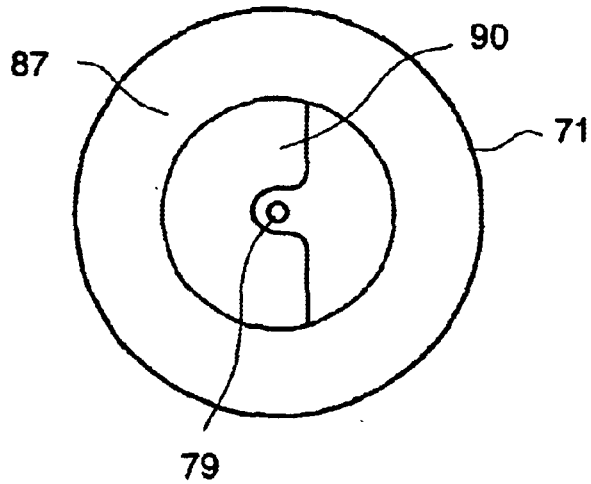
Figure 17D:
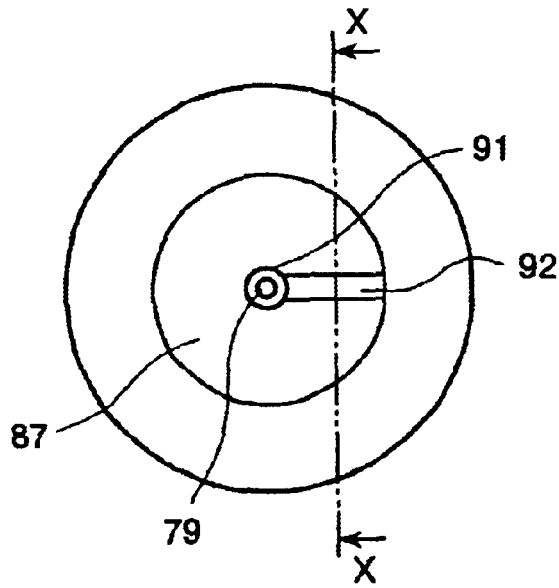
Figure 17E:
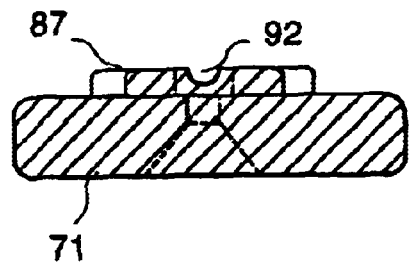

FIG. 15 and FIGS. 16(*a*) to 16(*f*) show one example of the method of forming the orifice plate 71.

(a) Through a cold forging processing, the outer form 71*a* of the orifice plate 71 is formed. In the present embodiment, a substantially concentrically semi-circular-shaped wall 88 is provided in a corresponding portion of the fuel injection hole formation portion, which has a larger diameter than the diameter of the fuel injection hole.

(b) The fuel injection hole 79 is formed. In this case, the fuel injection hole 79 is formed concentrically through a gap δ with the above-stated wall 88. Further, this fuel injection hole 79 is not punched out, but is formed with a voluntary depth part. As shown in FIG. 16(*b*), according to this formation, a raised portion 71 (*b*) is formed. Further, the gap δ is several 10 μm degree.

(c) In a next process, the valve seat for forming a seat portion is formed using a cut-off processing etc. The processing involves removing the above stated raised portion 71*b*.

Next, after a hardening, (d) The finishing of the essential portion, for example, the seat face 78 and the fuel injection hole 79 etc., is carried out.

FIGS. 17(*a*) to 17(*e*) show modified examples of the orifice plate 71. The embodiment shown in FIGS. 17(*a*) and 17(*b*) provides an example in which a wall face 90 for constituting an L-shaped cut-off face is formed to be longer and more remote from the fuel injection hole 79. Further, the embodiment shown in FIG. 17(*c*) and 17(*d*) provides an example, in which after the face wall 91 has been extended from the fuel injection hole 79 in the same axial direction, a part of the wall is removed with a recessed portion 92.

Namely, in the above stated embodiments, since a portion is provided for suitably altering the orifice plate 71 according to the capacity of the internal combustion engine and the installation angle of the fuel injector then an improvement in the productivity can be expected.

Figure 18A:
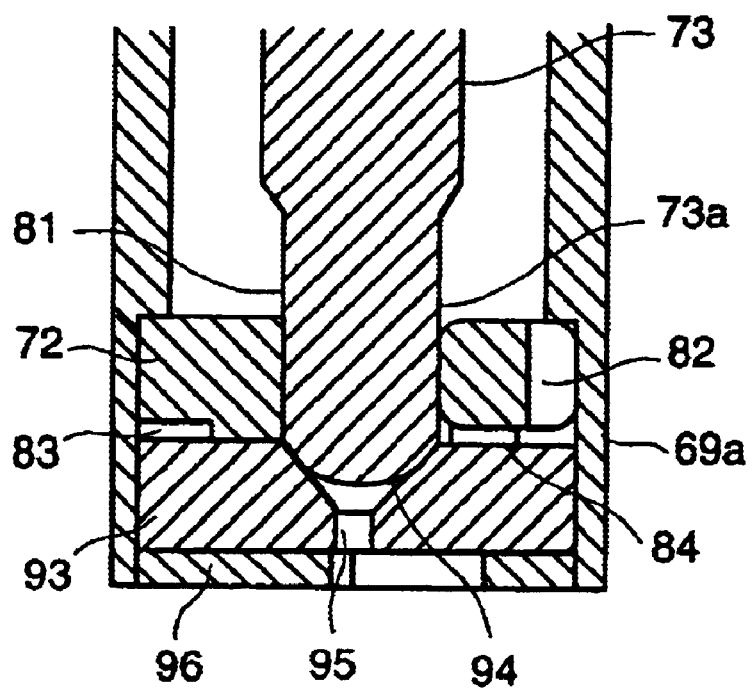
FIG. 18($a$) is a longitudinal sectional view showing another embodiment of a nozzle of a fuel injector, and FIG. 18($b$) is an end view thereof.
Figure 18B:
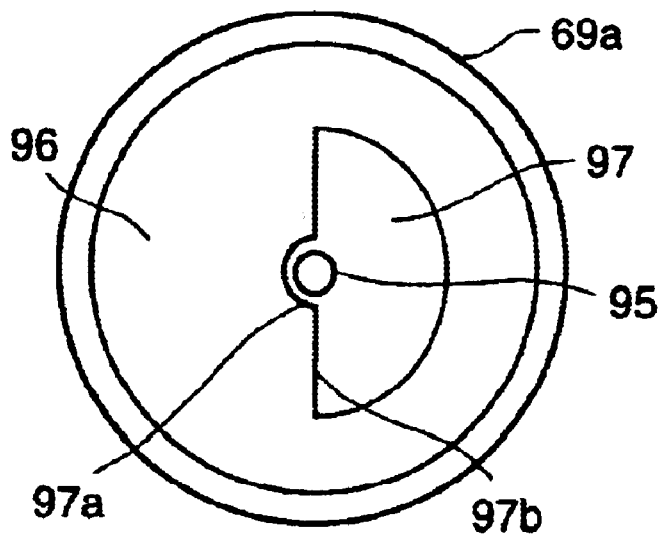

Next, another embodiment of the nozzle tip end will be explained. FIGS. 18(*a*) and 18(*b*) show an embodiment of an orifice plate having a divisional construction. This figure is an enlarged cross-sectional view showing the vicinity of the tip end of the nozzle holder 69.

An orifice plate 93 according to this embodiment is formed, for example, with a stainless group disc-shaped chip having at a center thereof a fuel injection hole 95 (the orifice), and upstream of this fuel injection hole 95, a valve seat 94 is formed. The orifice plate 93 is installed under pressure into the tip end 69*a* of the nozzle holder 69. At a lower face of the orifice plate 93, a fuel spray formation plate 96, which corresponds to an L-shaped cut-off, is provided.

In the fuel spray formation plate 96, a semi-circular shape hole 97 is formed by punching-out etc., and a wall 97*a*, which is concentrical to the fuel injection hole 95, and a wall 97*b*, coinciding substantially with an axial center of the fuel injection hole 95, are provided. Further, after the insertion under pressure of the fuel swirl element 72 by pressing, the orifice plate 93 and the fuel spray formation plate 96 are welded and fixed in place. This welding is carried out so as to extend over one periphery of a combined boundary portion using laser welding etc. to maintain the fuel seal performance.

Further, to the offset passage 84 of the fuel swirl element 72, a part (a part of the row material) of the side of the orifice plate 93 is rounded in and a rotation dent is carried out. In this embodiment, since the structures of the respective components are simplified, it has the advantage of a reduced cost. Further, since thermal deformation during welding does not affect the fuel injection hole 95 and the valve seat 94, which are provided with a high accuracy finishing, the assembly performance can be advantageous.

Figure 19A:
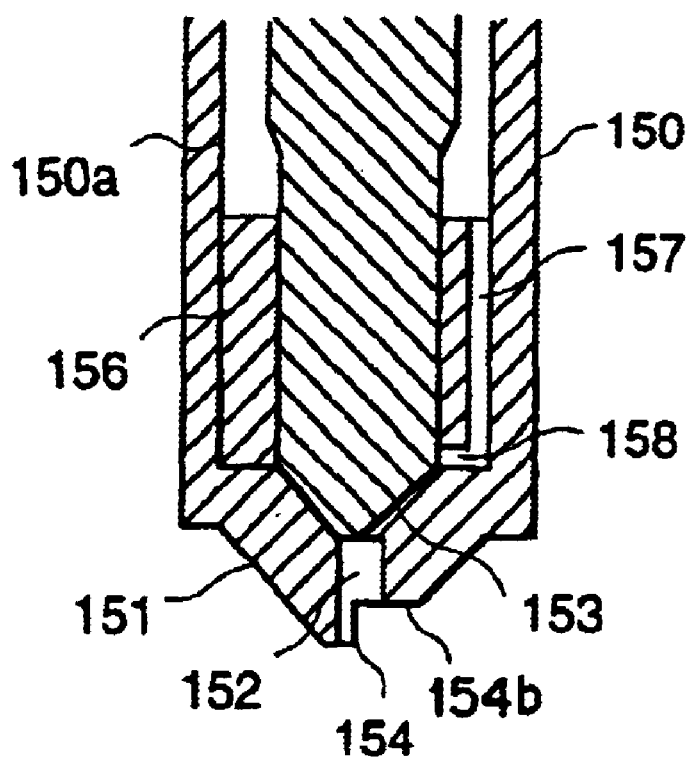
FIG. 19($a$) is a longitudinal sectional view showing another embodiment of a nozzle of a fuel injector and FIG. 19($b$) is an end view thereof.
Figure 19B:
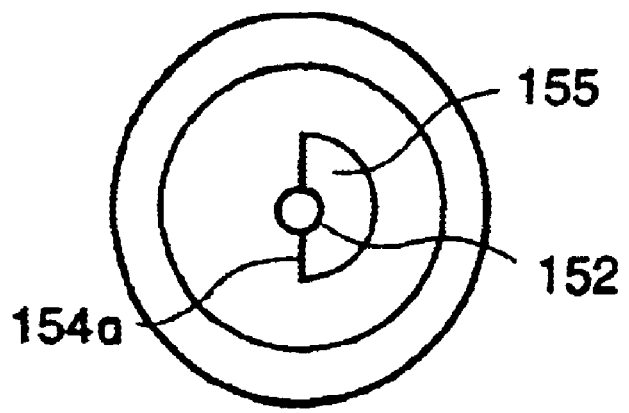

FIGS. 19(*a*) and 19(*b*) show an embodiment in which the nozzle tip end face is adapted to provide a cone-shaped fuel injector. A fuel injector hole 152 is positioned in an end face of a cone-shaped portion 151, which is positioned in a tip end portion of the nozzle. An L-shaped cut-off, which is comprised of a wall 154*a*, is positioned substantially at a center of the fuel injection hole 152 and is substantially orthogonal to a wall 154*b* which is cut off with a voluntary depth.

Upstream of a valve seat 153, a fuel swirl element 156 is fixed under pressure in contact with a nozzle inner wall 150*a*. The fuel passes from a longitudinal passage 157 provided in the fuel swirl element 156 to a swirl passage 158, and then a swirl is applied to the fuel and the fuel is injected from the fuel injection hole 152. In this case, a deflection fuel spray is generated suitably as a result of to the cut-off portion.

Figure 20A:
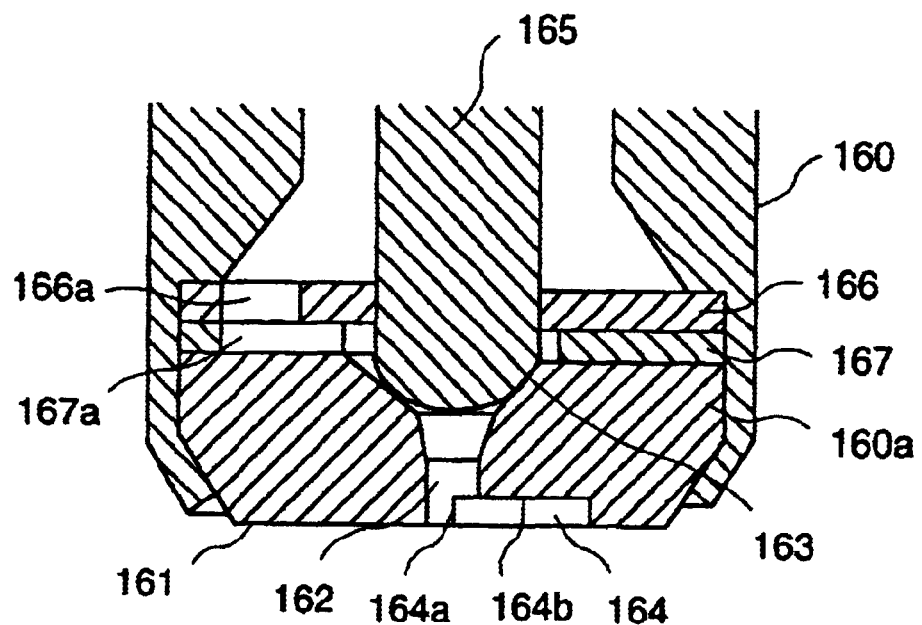
FIG. 20($a$) is a longitudinal sectional view showing another embodiment of a nozzle of a fuel injector, and FIG. 20($b$) is an end view thereof.
Figure 20B:
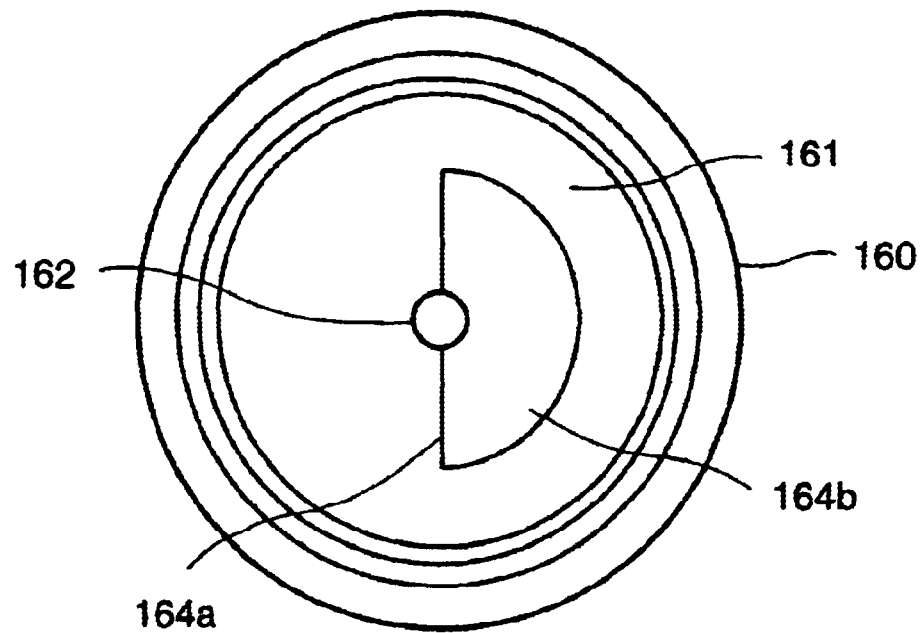

FIGS. 20(*a*) and 10(*b*) show an embodiment having a structure in which the fuel swirl element is divided into two parts.

At an enlarged diameter portion 160*a* of a nozzle 160, a fuel swirl member, comprised of a fuel plate 166, having plural vertical passages 166*a*, and a swirl plate 167, having plural swirl passages 167*a*, is inserted, and then an orifice plate 161 is inserted and fixed in contact with a lower face of the fuel swirl member.

In the orifice plate 161, a fuel injection hole 162 is provided downstream of a valve seat face 163. In this fuel injection hole 162 portion, an L-shaped cut-off is formed, which is comprised of a wall 164*a* positioned substantially at a center of the fuel injection hole 162 and substantially orthogonal to a wall 164*b* which is cut off at a voluntary depth.

As stated above, with a simple structure in which a cut-off is provided in the tip end portion of the fuel injector, a deflection fuel spray is generated, and since the deflection angle of this fuel spray will hardly change under the pressurized atmosphere in the engine cylinder, a combustible air-fuel mixture can be generated suitably in the ignition plug direction.

Next, of application of the invention examples to various types of internal combustion engines will be explained.

Figure 21:
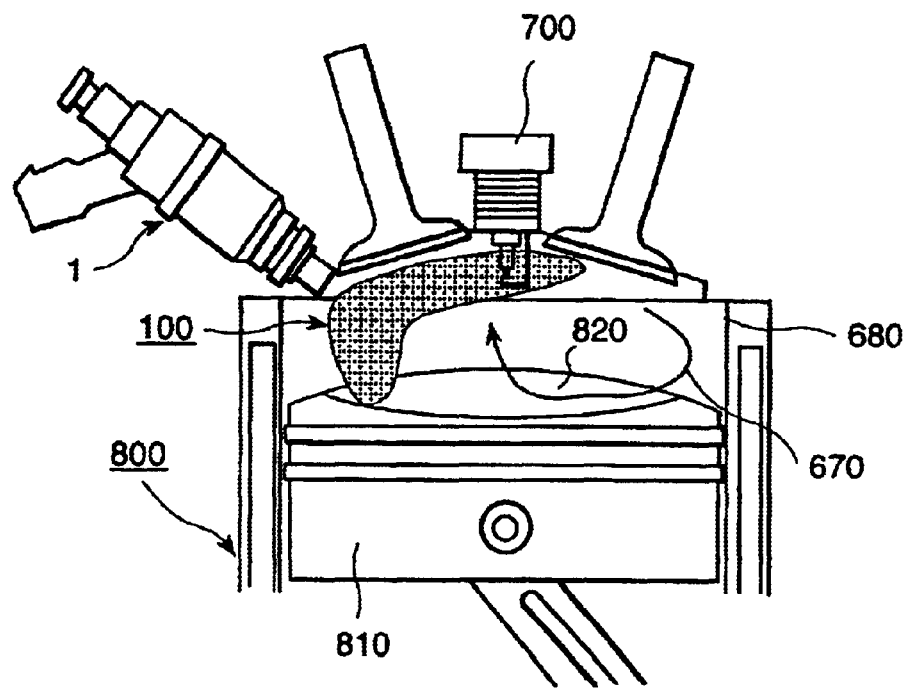
FIG. 21 is a cross-sectional view of a cylinder of an internal combustion engine.

FIG. 21 shows an example directed to an internal combustion engine 800 having a piston which has a tumble flow preservation cavity. The internal combustion engine 800 has a piston 810 which has a shallow dish-shaped cavity 820. With this piston 810, a tumble 670 is preserved, and fuel adhesion to a side of the piston 810 from the deflection fuel spray 100 can be restrained. Also, the fuel spray fluidization in the ignition plug direction 700 can be assisted, so that the combustible air-fuel mixture is introduced suitably to the ignition plug 700. With this, the HC discharge amount can be restrained, and a stable combustion can be carried out.

Figure 22:
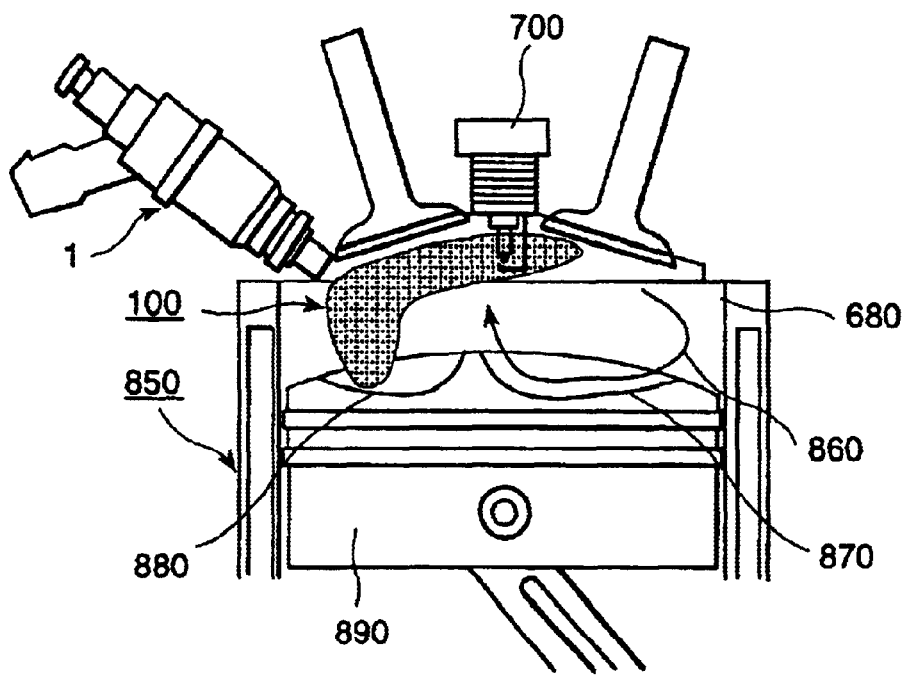
FIG. 22 is a cross-sectional view of a cylinder of an internal combustion engine.

FIG. 22 shows an example directed to an internal combustion engine 850 having a piston which has two cavities for guiding the tumble flow 860 preservation and the fuel spray 100. The internal combustion engine 850 has a piston 890 in which there are two cavities, including a tumble flow guiding cavity 870 and a fuel spray guiding cavity 880. By preserving the tumble flow 860, the fuel spray fluidization in the ignition plug 700 direction can be assisted, the fuel spray can be guided and the combustible air-fuel mixture can be introduced in a stable state. Accordingly, a stable combustion can be carried out.

In FIG. 23, to restrain the penetration of the fuel spray during one injection time, at least at one injection time, two times the fuel is injected and supplied to the internal combustion engine 800, so that combustion is carried out. Relating to the available injection methods, there are various processes. For example, when the internal combustion engine 800 is in a high load and the low rotation state, the fuel is injected plural times during the intake stroke, so that the penetration of the fuel spray is restrained and the fuel adhesion to the wall face of the cylinder 680 at the exhaust side and the crest face of the piston 810 can be restrained. On the other hand, when the internal combustion engine 800 is in a low load and the low rotation state, the fuel is injected plural times during the compression stroke and the fuel spray is guided by the tumble flow 820, so that a stable combustion in the form of stratification combustion can be realized.

The fuel spray embodiment shown in FIG. 23 shows the manner, during a low load and low rotation state, in which the first fuel spray 100a injected the first time remains in the area surrounding the ignition plug 700. After that, before long, the second fuel spray 100b catches up and reaches the area surrounding the ignition plug 700. Thus, a combustible air-fuel mixture remains in the area of the ignition plug 700 during a long period, so that a stable combustion in any internal combustion engine in which stratification combustion is difficult can be realized.

FIG. 24(a) is a schematic wiring diagram of a drive circuit 400 of the fuel injector 31 used in the above-stated tests, and FIG. 24(b) is a diagram of drive current wave-forms.

In FIG. 24(a), the core 2, the control coil 111 and the hold coil 112 of the fuel injector are shown. To a control circuit 400, a battery voltage is supplied from a battery VB, and in accordance with a control signal from an engine controller 410, control of the supply of electric current to the control coil 111 and the hold coil 112 is carried out.

The control circuit 400 includes a hold coil transistor ON/OFF circuit 104 for carrying out control of the electric supply to the hold coil 112 and a control coil transistor ON/OFF circuit 114 for carrying out control of the electric supply to the control coil 111. The respective transistor ON/OFF circuits 104 and 114 each control the supply of electric current to the respective coils 111 and 112, which electric current is detected by a hold coil current detection resistor 103R and a control coil current detection resistance 113R. In accordance with this information and an output of a signal processing circuit 120, in which a fuel injection signal from the engine control 41 is made standard, the respective transistor ON/OFF circuits 104, 114 send an electric supply signal to a hold coil power transistor 102t and a control coil power transistor 112t, respectively. When the hold coil power transistor 102t and the control coil power transistor 112t are switched to the "ON" state, the voltage of the battery VB is applied to the hold coil 112 and the control coil 111.

Reference numerals 101R and 111R are equivalent circuits representing the interior resistances and drive circuits of the hold coil 112 and the control coil 111. The hold coil 112 and the control coil 111 have respectively different electrical characteristics.

The hold coil 112 and the control coil 111 perform a different role in the respective stages of operation of the valve, including the opening of the valve, the holding of an open valve, and the closing of the valve. The control coil 111, in this embodiment, is a coil which is used exclusively in an internal opening valve condition and the hold coil 112 is a coil which is used in holding the valve in an open condition.

During the opening valve time, the control coil 111 of this embodiment and the power transistor 112 of this coil 111 operate as follows. First, the winding diameter of the control coil 111 is a bold wiring structure having a small resistance rate. Also, since the power transistor 112t is formed with a bipolar, CMOS or bi-CMOS device, and the "ON" resistance during the electric supply is reduced, the equivalent interior resistance 111R of the control coil circuit is reduced. Further, according to the resistance value of the interior portion resistance 111R, which is determined in accordance with this constitution, the winding number is set in the vicinity of a valve in which the peak magneto-motive force is the maximum.

The start of electric supply to the hold coil 112 need not take place at the same time that the fuel injection signal is input, and so it is sufficient to energize the holding coil with a delay. On the other hand, this peak current during the fuel injection rise-up time of the hold coil 112 can be lower in a case in which the electric supply to the hold coil 112 starts at the same time as input of the fuel injection signal.

As stated above, since the electric supply to the hold coil 112 can be delayed, during a fuel injection signal rise-down time, namely, the current during the closing valve command time, can be reduced, and then the closing valve late can be made to the short-circuit. In this embodiment, to the control 111 and the hold coil 112, in which the characteristic is determined as stated above, in the first time fuel injection timing, two times the current flow shut-off is generated.

The fuel injection apparatus constituted as stated above operates as follows. ECU 410 outputs to the drive circuit 400 a command Tg of plural injection times in accordance with the operating conditions of the internal combustion engine. In the drive circuit 400, for the first injection period T2, in response to the signal processing circuit 120, the control coil transistor 112t and the hold coil use transistor 102t are switched to the "ON" state. The total current as viewed from the battery is shown with a bold line in FIG. 24(b).

The transistor 102t switches to the "OFF" state after the time t2 has elapsed. The transistor 102t is controlled during the first fuel injection period T2 all the time. According to this operation, the valve is opened by a sum of the holding forces of both coils and is maintained in the open valve state by the magneto-motive force of the control coil 111. At this time, the fuel is passed through the fuel swirl element 22 and is injected into the combustion chamber from the fuel injection hole.

When the first fuel injection time T2 elapses, since the electric supply to the transistor 102t is shut off, the hold coil 112 is demagnetized, and the plunger 4A is pushed back by the return spring member 16 so that the valve 30 seats on the valve seat 6 and the fuel injection hole is closed.

However, after the slight closing valve interval t4, a second fuel injection period T3 is initiated again from the signal processing 120 in the drive circuit 400 by switching the control coil transistor 112*t* and the hold coil transistor 102*t* to the "ON" state through the circuit 114 and the circuit 104, respectively.

The total current as viewed from the battery is shown with a bold line in FIG. 24(*b*). The transistor 112*t* is switched to the "OFF" state after the time t3 elapses. The transistor 112*t* is controlled to present "OFF" state during the second fuel injection period T3 all the time.

According to this, the valve is opened by a sum of the magneto-motive forces of the both coils and is maintained in the open valve state by the holding force of the control coil 111. At this time, the fuel is passed through the fuel swirl element 22 and is injected into the combustion chamber from the fuel injection hole.

When the time T3 elapses, since the electric supply to the transistor 102*t* is shut off, the coil is demagnetized, and the plunger 4A is pushed back by the return spring member 16 so that the valve 30 seats on the valve seat 6 and the fuel injection hole is closed. Thus, the second time fuel injection is completed.

In this embodiment, regardless of whether the fuel injector needs to be driven at a high speed, the fuel injector can be driven with the power supply voltage. Further, after the closing of the valve, since a slight holding current is held, during one fuel injection timing, the fuel injector is opened and closed two times or more than two times, so that the electric power consumption can be lessened.

Further, when the battery VB becomes 42V, the drive current is lowered at the part in which the voltage becomes high and when the current is made the same since the winding number of the coil can be reduced, then the fuel injector can be made compact.

FIGS. 25(*a*) and 25(*b*) show the effects of the two times fuel injection on the combustion stability range. FIG. 25(*b*) shows the combustion stability range compared with the first embodiment according to the present invention by taking the fuel injection timing on the horizontal axis and the ignition timing on the vertical axis.

At the ignition timing in which the fuel consumption becomes the best, in comparison with the combustion stability range 900 of the first embodiment, which becomes extremely wide compared with the conventional internal combustion engine, since two times fuel injection is carried out, and since the combustible air-fuel mixture remains longer in the area surrounding the ignition plug, ranging over a long period of time, the combustible stable range 910 is made even wider. Accordingly, a stable combustion can be carried out regardless of the engine rotation number, and the fuel consumption can be improved further.

According to the present invention, a good ignition performance of the internal combustion engine can be obtained, and an enlargement in the combustion stability range can be achieved, while, at the same time, the discharge amount of the unburned gas components in the combustion can be reduced.

What is claimed is:

1. In an internal combustion engine comprising a cylinder, a piston which reciprocates in said cylinder, an intake means for taking an air into said cylinder, an exhaust means for discharging a combustion gas from said cylinder, a fuel injector for injecting directly a fuel into said cylinder, a fuel supply means for supplying the fuel into said fuel injector, and an ignition means for igniting an air-fuel mixture which is the air taken in said cylinder according to said intake means and the fuel injected into said cylinder using said fuel injector, the internal combustion engine characterized in that said fuel injector generates a fuel spray which has a cut out portion in which a fuel spray is thin in a peripheral direction in a lateral cross-section crossing a valve axial line of the fuel spray and injects said cut-out portion in which the fuel spray is thin toward a side of said piston, and the air taken in from said intake means is flown toward a side of said piston of the fuel spray to a side of said ignition plug.

2. An internal combustion engine, according to claim 1, characterized in that said fuel injector has a large fuel spray angle in the side of said ignition means and a small fuel spray angle in the side of said piston.

3. An internal combustion engine, according to claim 1, characterized in that said fuel injector has an orifice plate which forms a fuel injection hole for penetrating said orifice plate in a plate thickness direction, and a fuel spray formation plate for forming said cut-out portion of the fuel spray in an outlet portion of said fuel injector.

4. In an internal combustion engine comprising a cylinder, a piston which reciprocates in said cylinder, an intake means for taking an air into said cylinder, an exhaust means for discharging a combustion gas from said cylinder, a fuel injector for injecting directly a fuel into said cylinder, a fuel supply means for supplying the fuel into said fuel injector, and an ignition means for igniting an air-fuel mixture which is the air taken in said cylinder according to said intake means and the fuel injected to said cylinder using to said fuel injector, the internal combustion engine characterized in that said fuel injector generates a fuel spray which has a cut-out portion in which a fuel spray is thin in a peripheral direction in a lateral cross-section crossing a valve axial line of the fuel spray and injects at least two times said cut-out portion in which the fuel spray is thin toward a side of said piston, during one time timing.

5. An internal combustion engine, according to claim 4, characterized in that under a stated of a high load and a low rotation time, during an intake stroke the fuel is divided into plural times and injects from said fuel injector, and under a state of a low load and a low rotation, during a compression stroke the fuel is divided into plural times and injects from said fuel injector.

* * * * *